(12) United States Patent
Kim et al.

(10) Patent No.: US 11,049,167 B1
(45) Date of Patent: *Jun. 29, 2021

(54) CLUSTERING INTERACTIONS FOR USER MISSIONS

(71) Applicant: Amazon Technologies, Inc., Seattle, WA (US)

(72) Inventors: Ilseo Kim, Bellevue, WA (US); James Dai-fu Chan, Bellevue, WA (US); Jean Joseph Tavernier, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 114 days.

This patent is subject to a terminal disclaimer.

(21) Appl. No.: 16/390,624

(22) Filed: Apr. 22, 2019

Related U.S. Application Data

(62) Division of application No. 14/666,134, filed on Mar. 23, 2015, now Pat. No. 10,311,499.

(51) Int. Cl.
*G06Q 30/06* (2012.01)
*G06Q 30/02* (2012.01)
*G06F 16/22* (2019.01)

(52) U.S. Cl.
CPC ..... *G06Q 30/0631* (2013.01); *G06F 16/2291* (2019.01); *G06Q 30/0251* (2013.01); *G06Q 30/0255* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 6,085,220 A | 7/2000 | Courts et al. | |
| 7,881,984 B2 | 2/2011 | Kane et al. | |
| 8,015,259 B2 | 9/2011 | Swahn | |
| 8,086,480 B2 | 12/2011 | Deo et al. | |
| 8,180,778 B1 | 5/2012 | Pedersen et al. | |
| 8,434,020 B2 | 4/2013 | Martyn | |
| 8,543,907 B1 | 9/2013 | Roskind | |

(Continued)

OTHER PUBLICATIONS

Alharbi, S., "AWRT: A Recommender System for Improving Revisiting Web Pages," Journal of Computers, 8.10: 2544(9), Academy Publisher, Oct. 2013. (Year: 2013).*

(Continued)

*Primary Examiner* — Nicholas D Rosen
(74) *Attorney, Agent, or Firm* — Kilpatrick Townsend & Stockton LLP

(57) ABSTRACT

Techniques for identifying clusters of user interactions and shopping missions may be provided. For example, the system may receive a history of interactions between a user and one or more network pages. The system may identify a most recent event from the history of interactions and identify a cluster that includes other events from the history of interactions that are of a same category as the most recent event. The determination of the cluster may be based in part on item attributes associated with the item presented on the at least one of the one or more network pages. The most recent event may then be associated with the cluster. In some examples, a shopping mission is determined and one or more notifications are provided to a user, merchant, or electronic marketplace in association with the identified shopping mission.

20 Claims, 13 Drawing Sheets

(56) References Cited

U.S. PATENT DOCUMENTS

| | | | |
|---|---|---|---|
| 8,620,745 | B2 | 12/2013 | You et al. |
| 8,645,221 | B1 | 2/2014 | Sarma |
| 8,713,476 | B2 | 4/2014 | Martyn |
| 8,776,228 | B2 | 7/2014 | Natarajan et al. |
| 8,954,524 | B1 | 2/2015 | Hamon |
| 9,082,123 | B2 | 7/2015 | Deo et al. |
| 9,189,551 | B2 * | 11/2015 | Goodson ............ G06F 16/3331 |
| 9,402,161 | B2 | 7/2016 | Marti et al. |
| 9,767,204 | B1 * | 9/2017 | Hoover ............... G06F 16/9535 |
| 9,818,145 | B1 | 11/2017 | Finkelstein et al. |
| 10,311,499 | B1 | 6/2019 | Kim et al. |
| 2004/0049541 | A1 | 3/2004 | Swahn |
| 2007/0005437 | A1 | 1/2007 | Stoppelman |
| 2008/0243632 | A1 | 10/2008 | Kane et al. |
| 2009/0171968 | A1 | 7/2009 | Kane et al. |
| 2010/0076857 | A1 | 3/2010 | Deo et al. |
| 2010/0114654 | A1 | 5/2010 | Lukose et al. |
| 2011/0125658 | A1 | 5/2011 | Lanxner et al. |
| 2011/0313800 | A1 | 12/2011 | Cohen et al. |
| 2012/0158552 | A1 | 6/2012 | Smith |
| 2012/0191531 | A1 | 7/2012 | You et al. |
| 2013/0024456 | A1 * | 1/2013 | Goodson ............ G06F 16/951 707/740 |
| 2013/0133066 | A1 | 5/2013 | Natarajan et al. |
| 2015/0161634 | A1 | 6/2015 | Pai et al. |
| 2015/0213492 | A1 | 7/2015 | Aleksandrovsky |
| 2016/0029176 | A1 | 1/2016 | Marti et al. |

OTHER PUBLICATIONS

U.S. Appl. No. 14/665,984 , "U.S. Patent Application", filed Mar. 23, 2015.

U.S. Appl. No. 14/666,134 , "Final Office Action", dated Nov. 1, 2018, 21 pages.

U.S. Appl. No. 14/666,134 , "Non Final Office Action", dated Apr. 26, 2018, 25 Pages.

U.S. Appl. No. 14/666,134 , "Non-Final Office Action", dated Oct. 2, 2017, 26 pages.

U.S. Appl. No. 14/666,134 , "Notice of Allowance", dated Jan. 23, 2019, 10 pages.

U.S. Appl. No. 14/666,134 , "Restriction Requirement", dated Jul. 18, 2017, 6 pages.

U.S. Appl. No. 14/666,134 , "U.S. Patent Application", filed Mar. 23, 2015.

U.S. Appl. No. 14/665,984 , Final Office Action, dated Dec. 4, 2020, 14 pages.

U.S. Appl. No. 14/665,984 , Final Office Action, dated Aug. 28, 2018, 32 pages.

U.S. Appl. No. 14/665,984 , Non-Final Office Action, dated Jan. 16, 2018, 16 pages.

U.S. Appl. No. 14/665,984 , Non-Final Office Action, dated Jun. 11, 2019, 32 pages.

"Clustering Interactions for User Missions", U.S. Appl. No. 14/666,134, filed Mar. 23, 2015.

* cited by examiner

US 11,049,167 B1

CLUSTERING INTERACTIONS FOR USER MISSIONS

CROSS-REFERENCE TO RELATED APPLICATIONS

This application is related to and incorporates by reference for all purposes the full disclosure of U.S. patent application Ser. No. 14/666,134 and U.S. patent application Ser. No. 14/665,984, both filed Mar. 23, 2015.

BACKGROUND

People frequently browse web pages in search of items. The search can be quick, because the user types the name of the item into the search tool and the search tool returns a web page dedicated to the item. Other times, the user may not be sure which item they ultimately want and browse through multiple web pages in search for the unknown item. However, it may be difficult to help a user find their desired item, especially when the user's intent may be unknown even to the themselves.

BRIEF DESCRIPTION OF THE DRAWINGS

Various embodiments in accordance with the present disclosure will be described with reference to the drawings, in which.

DETAILED DESCRIPTION

Figure 1:
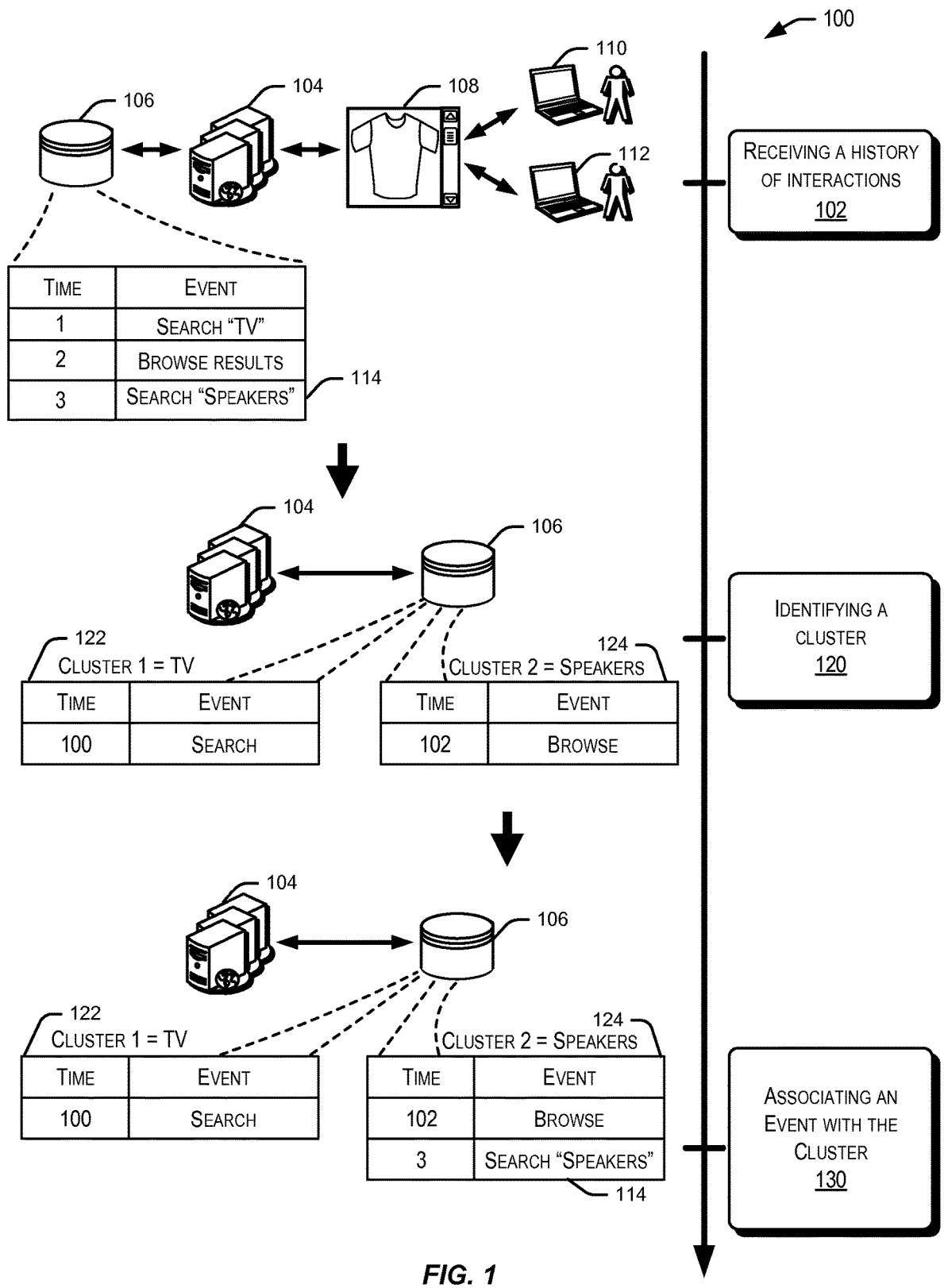
FIG. 1 illustrates an example flow for associating one or more interactions with a cluster of interactions or a shopping mission described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for associating interactions between a user and one or more network pages with a cluster or shopping mission. For example, the system may receive a history of interactions between a user and one or more network pages that may include a time of the interaction, an item presented on at least one of the one or more network pages, and/or an identification of the interaction performed. The network pages may be associated with an electronic marketplace. The system may identify an event from the history of interactions based in part on the time of the interaction, and identify a cluster that includes other events from the history of interactions that are of a same category as the identified event. The determination of the cluster may be based in part on item attributes associated with the item presented on the network page. The identified event may then be associated with the cluster.

In an illustrative example, a computer provides multiple web pages for multiple items from multiple merchants through an electronic marketplace. A user provides a search term "TV" to a search tool on the web page, which returns a list of televisions. The user selects one of the items on the list. Next to the item on the list is a recommendation for an item, which the user also selects to access a second item. This second item may be related to speakers. The user then browses through the web pages associated with the speakers. The user then returns to a web page associated with televisions and orders the second television from the original list. The computer groups the interactions into two clusters by starting with the first interaction (e.g., utilizing a forward clustering process), including associating the first interaction in one cluster associated with televisions and associating the second interaction in one cluster associated with speakers. The clusters may be stored in memory such that subsequent interaction may be processed, either adding those interactions to one of the stored clusters or creating a new cluster. The computer then determines that the user initiated two shopping missions, which are also related to ultimately wanting to purchase a television and speakers. The computer may also determine that one shopping mission is complete (e.g., televisions, because the user ordered a television) and one shopping mission is incomplete (e.g., speakers, because the user did not order speakers). Actions may be performed by the computer based on these identified clusters, shopping missions, and mission states. For example, the computer may provide recommendations for items, display information or advertisements about items, predict a future shopping mission related to a past shopping mission, or the like.

In another illustrative example, using details about the interactions described above, the computer may initiate a clustering process online (e.g., as interactions are identified) without storing the clusters after the process. For example, a history of interactions can be identified, which indicates that the user interacted with televisions and speakers as described above. Using this information, the computer starts with the most recent interaction to generate one cluster associated with televisions and one cluster associated with speakers. As opposed to the clustering process described above, this clustering is processed in a backward fashion (e.g., starting with one interaction and moving backward in time to earlier interactions). The computer then determines that the user initiated two shopping missions, which are also related to ultimately wanting to purchase a television and speakers. The computer may also determine that one shopping mission is complete (e.g., televisions, because the user ordered a television) and one shopping mission is incomplete (e.g., speakers, because the user did not order speakers). The clusters, shopping missions, and actions performed by the computer based on these identified clusters, shopping missions, and mission states may not be persisted in memory or storage associated with the computer in this example (e.g., processing the clusters online, on-the-fly, etc.).

In some examples, limiting some actions of the computer (e.g., providing item recommendations, advertisements, a buying guide to assist with a purchase, etc.) to shopping missions rather than an single item, can be helpful. For example, by relating a recommendation (e.g., the action) with a single item, the user may be shown an item that they viewed or searched for that was not purchased. This recommendation may be irrelevant for the user. As an illustration, the user may search for a first television, compare the first television with a second television, and ultimately purchase the second television. The user may not find the recommendation of the first television helpful, because the user purchased the second television instead of the first television.

In another example of limiting some actions of the computer to shopping missions rather than an single item, the computer may determine a depth of a shopping mission (e.g., has the user recently started researching an item to purchase, or do they know what they want and are close to purchasing the item, etc.). Based on the depth of the shopping mission, the computer may display a buying guide or various types of items to introduce the user to the related items that they might encounter during their shopping mission.

FIG. 1 illustrates an example flow for associating one or more interactions with a cluster of interactions or a shopping mission as described herein, according to at least one example. The process 100 can begin with receiving a history of interactions (e.g., providing a search query or request, browsing through search results, adding an item to an electronic shopping cart, reading an article about an item, etc.) at 102. For example, a computer system 104 can interact with a data store 106 to access the history of interactions and/or interaction with one or more network pages to determine the history of interactions. The network page 108 may contain one or more items. The computer system 104 may store information in the data store 106, including information associated with the item, an interaction with the item by users 110 and 112, an identification of network page 108, a merchant that provides the item, or an identification of the user(s) that access or interact with the network page. Other types of information may be stored with the data store 106 without diverting from the scope of the disclosure.

In some examples, the interactions may be stored in the data store 106 with a time identification of the interaction. For example, the first interaction may include "search 'TVs'," the second interaction may include "browse results," and the third interaction may include "search 'speakers'." The most recent event 114 of the interactions may include the third interaction, "search 'speakers'." The most recent event 114 may be identified from the history of interactions based in part on the time of the event or interaction (e.g., identified in the data store 106, identified by the computer system 104 that monitors the network page, etc.).

The process 100 may also identify a cluster at 120. For example, the computer system 104 can group the history of interactions in a cluster. For example, the interactions or events may be grouped in a cluster if they are associated with the same or similar category as previously clustered events, based in part on item attributes associated with the item presented on the one or more network pages (e.g., title of the item, description, model, price, image, merchant, etc.). In some examples, interactions or events can be grouped or identified as similar using a clustering algorithm, fuzzy clustering, or other methods discussed throughout the disclosure, including with FIGS. 6-9. The cluster can include events other than the most recent event 114 (e.g., the first event, other events prior to the most recent event, etc.) and/or other events from the history of interactions (e.g., that are of a same category as the most recent event 114). In some examples, any events may be identified and utilized as a starting point for determining clusters without diverting from the essence of the disclosure.

The process 100 may also associate the most recent event 114 with the cluster at 130. For example, the computer system 104 can identify one or more clusters 122 and 124 in the data store 106. The clusters may correspond to categories (e.g., television, speakers, etc.). The most recent event 114 may be stored, flagged in a data store, linked in a data store, or otherwise identified to be related or included with a particular cluster that is similar to the event (e.g., via the item description, categorization, or other identification of the cluster or item, etc.). In some examples, when the most recent event is not similar to a cluster, a new cluster may be formed that includes the most recent event.

In some examples, a shopping mission may also be determined. For example, the determined shopping mission can correspond with one or more clusters (e.g., one-to-one relationship between a cluster and shopping mission, or many clusters combined into one shopping mission, etc.). The shopping mission may be determined in a similar way to the identification of a cluster (e.g., using categorization techniques, clustering algorithms, through a heuristic classifier or heuristic classification method, determining a pairwise distance between two clusters/shopping missions, comparison with a threshold, fuzzy clustering, etc.) or may be limited based on the depth of a shopping mission (e.g., if the user continues to perform interactions related to a previously completed shopping mission, the shopping mission category may be broader than originally expected, etc.). Content may be provided to the user based on the identified shopping mission. The provided content may be based at least in part on a state of the user with respect to the identified shopping mission (e.g., complete/incomplete shopping mission, next shopping mission, etc.).

Figure 2:
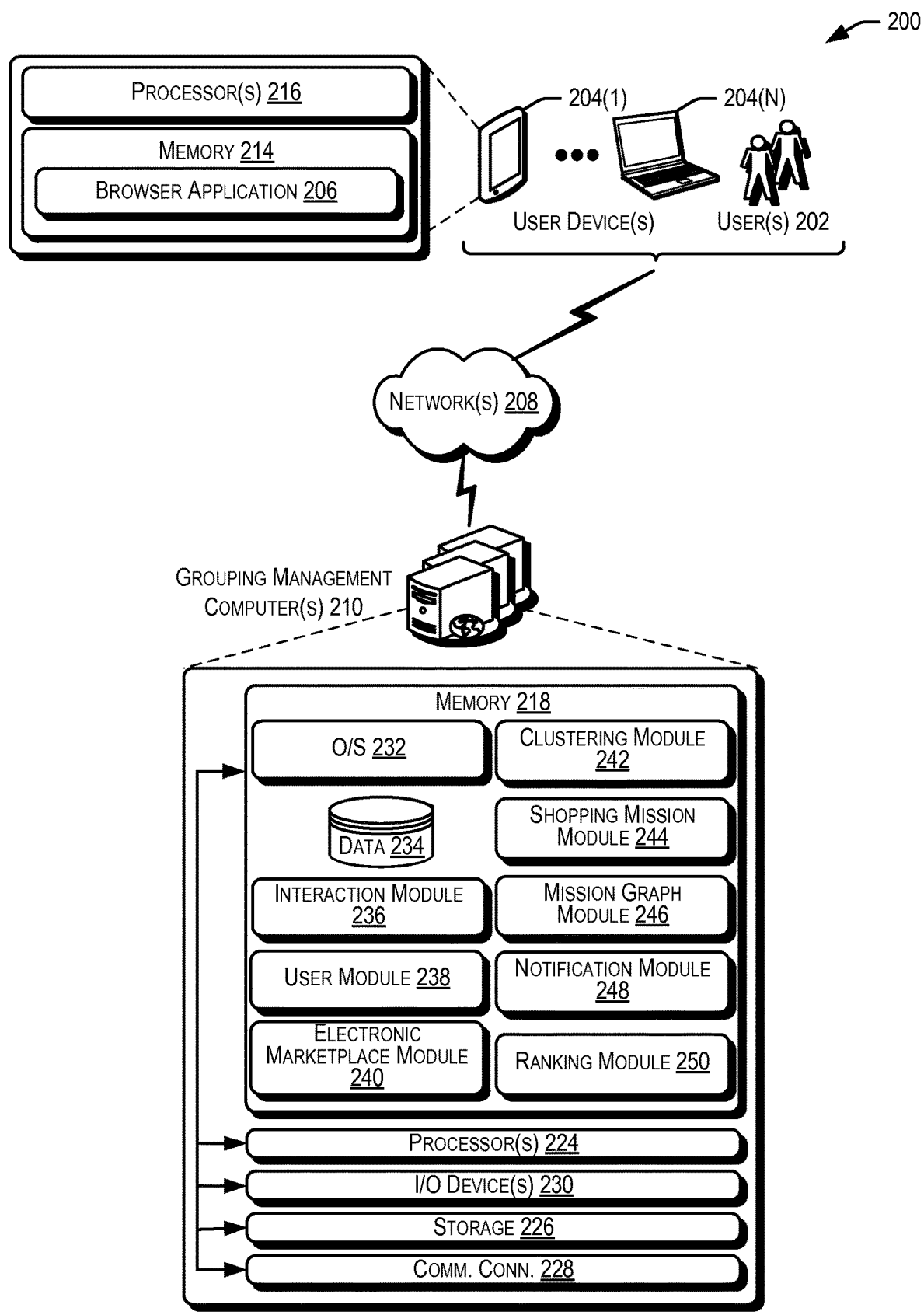
FIG. 2 illustrates an example architecture for associating one or more interactions with a cluster of interactions or a shopping mission that includes a grouping management computer and/or a user device connected via one or more networks, according to at least one example.

FIG. 2 illustrates an example architecture 200 for associating one or more interactions with a cluster of interactions or a shopping mission. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more grouping management computers 210. The one or more grouping management computers 210 may, in some examples, provide computing resources such as, but not limited to, client entities, low latency data storage, durable data storage, data access, management, virtualization, cloud-based software solutions, electronic content performance management, etc. The one or more grouping management computers 210 may also be operable to provide web hosting, computer application development, and/or implementation platforms, combinations of the foregoing, or the like to the one or more users 202. The one or more grouping management computers 210, in some examples, may help associate one or more interactions with a cluster of interactions or a shopping mission, and provide content to one or more user devices 204 based on the associations.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the grouping management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more grouping management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the grouping management computers 210 via the networks 208, or via other network connections. Additionally, the user devices 204 may be part of the distributed system managed by, controlled by, or otherwise part of the grouping management computers 210 (e.g., a console device integrated with the grouping management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the grouping management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the grouping management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the grouping management computers 210 may be in communication with the user devices 204 and/or other service providers via the networks 208, or via other network connections. The grouping management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the grouping management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of grouping management computers 210, the memory 218 may be volatile (such as RAM) and/or non-volatile (such as ROM, flash memory, etc.). The grouping management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the grouping management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the grouping management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The grouping management computers 210 may also contain communications connection(s) 228 that allow the grouping management computers 210 to communicate with a stored database, another computing device or server, user terminals and/or other devices on the networks 208. The grouping management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an interaction module 236, user module 238, electronic marketplace module 240, clustering module 242, shopping mission module 244, mission graph module 246, notification module 248, and/or ranking module 250. The modules may be software modules, hardware modules, or a combination thereof. If the modules are software modules, the modules will be embodied on a computer readable medium and processed by a processor in any of computer systems described herein.

The interaction module 236 may be configured to determine or receive a history of interactions between a user and one or more network pages associated with an electronic marketplace. The history of interactions can include various information, including a time of an interaction, an item presented on at least one network page, an identification of the interaction performed, where a user clicked on a network page (e.g., using clickstream analysis, etc.), interactions performed by the user to view additional detail about an item or merchant, item information (e.g., description, title, image of an item, etc.), and the like. The interaction module 236 may also be configured to determine a most recent event from the history of interactions based in part on the time of the interaction.

The user module 238 may be configured to determine data associated with a user or merchant that interacts with an electronic marketplace. This may include accessed network pages or items, name, location, items purchased or sold, and the like. The user module 238 may also be configured to identify, update, or create a profile for a user that includes a user's state with respect to an identified shopping mission (e.g., complete/incomplete, low/high depth, etc.). The profile may be used in part to determine which information about items are presented to the user through the electronic marketplace and/or may be managed online.

The electronic marketplace module 240 may be configured to enable one or more network pages for display. The network pages may be configured to provide items, lists of items, search tools to find items, and tools to assist merchants in offering the items to users. The electronic marketplace can include a plurality of merchants that offer the item (e.g., the same item, different items, etc.) through the electronic marketplace.

The clustering module 242 may be configured to create or identify a cluster. The cluster may include one or more events associated with a user from the user's history of interactions. The cluster may be limited to events that are of a same category as the most recent event, based in part on item attributes associated with the item presented on the at least one of the one or more network pages. The clustering module 242 may also be configured to associate one or more events with a cluster, determine a pairwise distance between an event and a cluster, associate an event with a cluster if the difference between the event and cluster is less than a threshold, instantiate a clustering process, or other methods of associating an event with a cluster based in part on the similarities between the two. Additional detail associated with the clustering module 242 and clustering is provided throughout the disclosure, including in association with FIGS. 6-9.

The shopping mission module 244 may be configured to analyze an event associated with the cluster to determine a shopping mission associated with the cluster and whether the shopping mission is complete, ongoing, or incomplete (e.g., by looking at interactions associated with the shopping mission in chronological order, by determining whether the user will likely purchase an item associated with the shopping mission in the future using other users' interactions who participated in similar shopping missions in the past, etc.). The shopping mission module 244 may also be configured to determine content to provide to the user based at least in part on a state of the user with respect to the identified shopping mission, perform a min-hashing analysis, identify the shopping mission depth associated with the user, determine a probabilistic model or predictive model (e.g., using a heuristic classification), and other analytics discussed throughout the disclosure associated with a shopping mission. Additional detail associated with the shopping mission module 244 and analysis of shopping missions is provided throughout the disclosure, including in association with FIGS. 6-9.

The mission graph module 246 may be configured to generate a mission graph to identify similarities between interactions performed by other users, purchased items, shopping missions, item identifiers, and other data. The mission graph (e.g., as explained in more detail in association with at least FIGS. 10-12) may be used to predict a likely next shopping mission of the user or predict a low likelihood or bias toward other shopping missions of the user.

Figure 10:
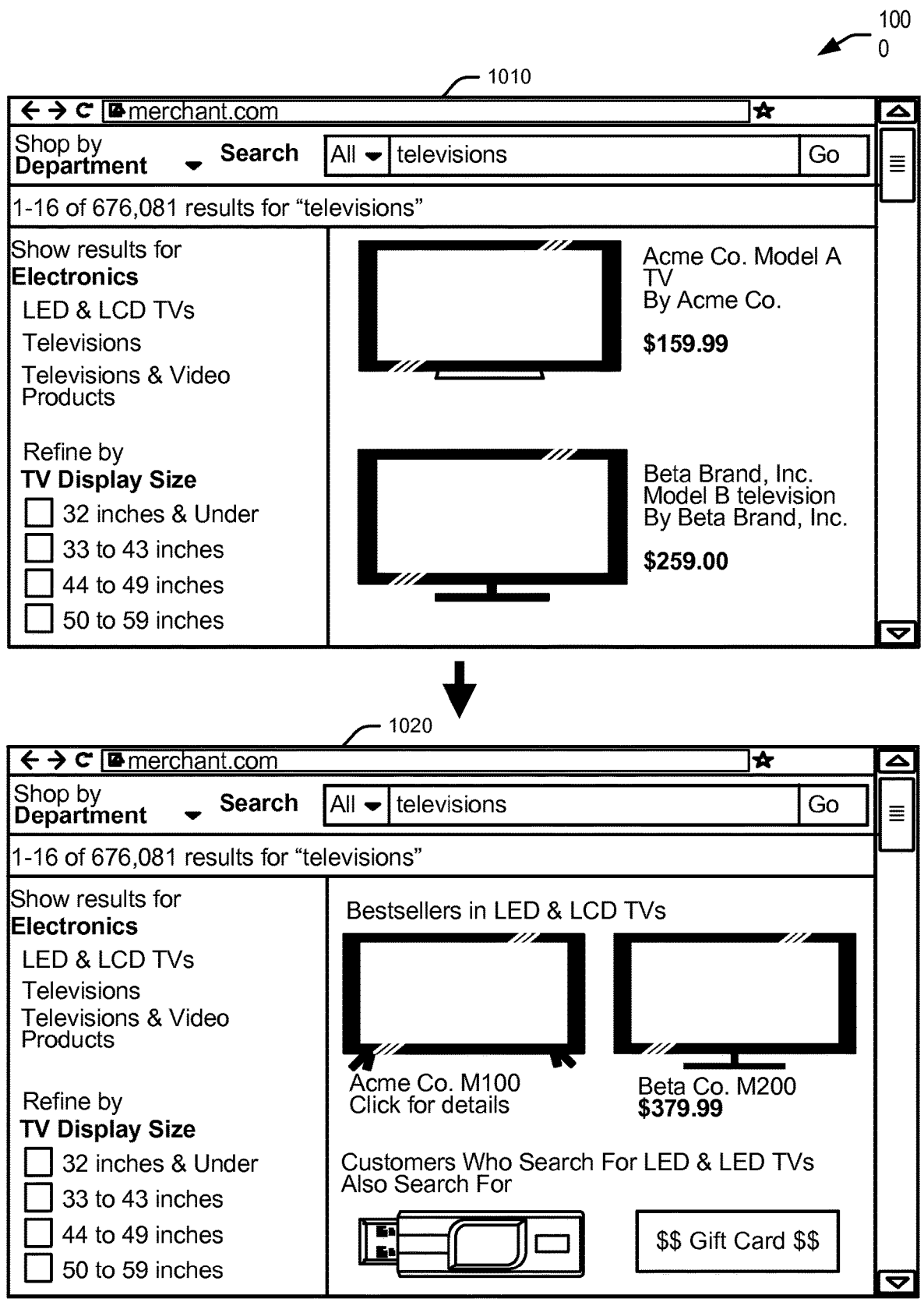
FIG. 10 illustrates an example of a notification described herein, according to at least one example.
Figure 11:
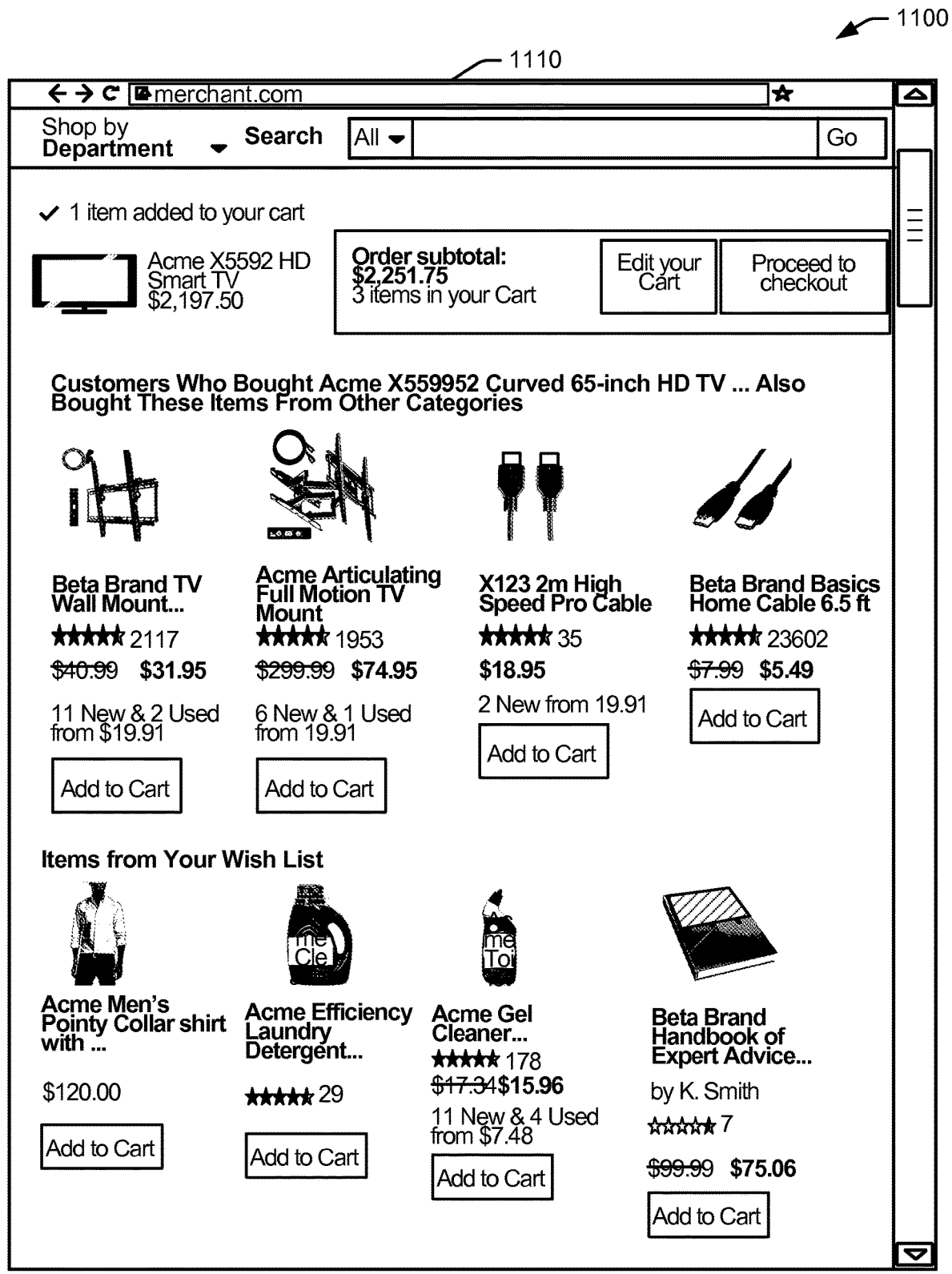
FIG. 11 illustrates an example of a notification described herein, according to at least one example.
Figure 12:
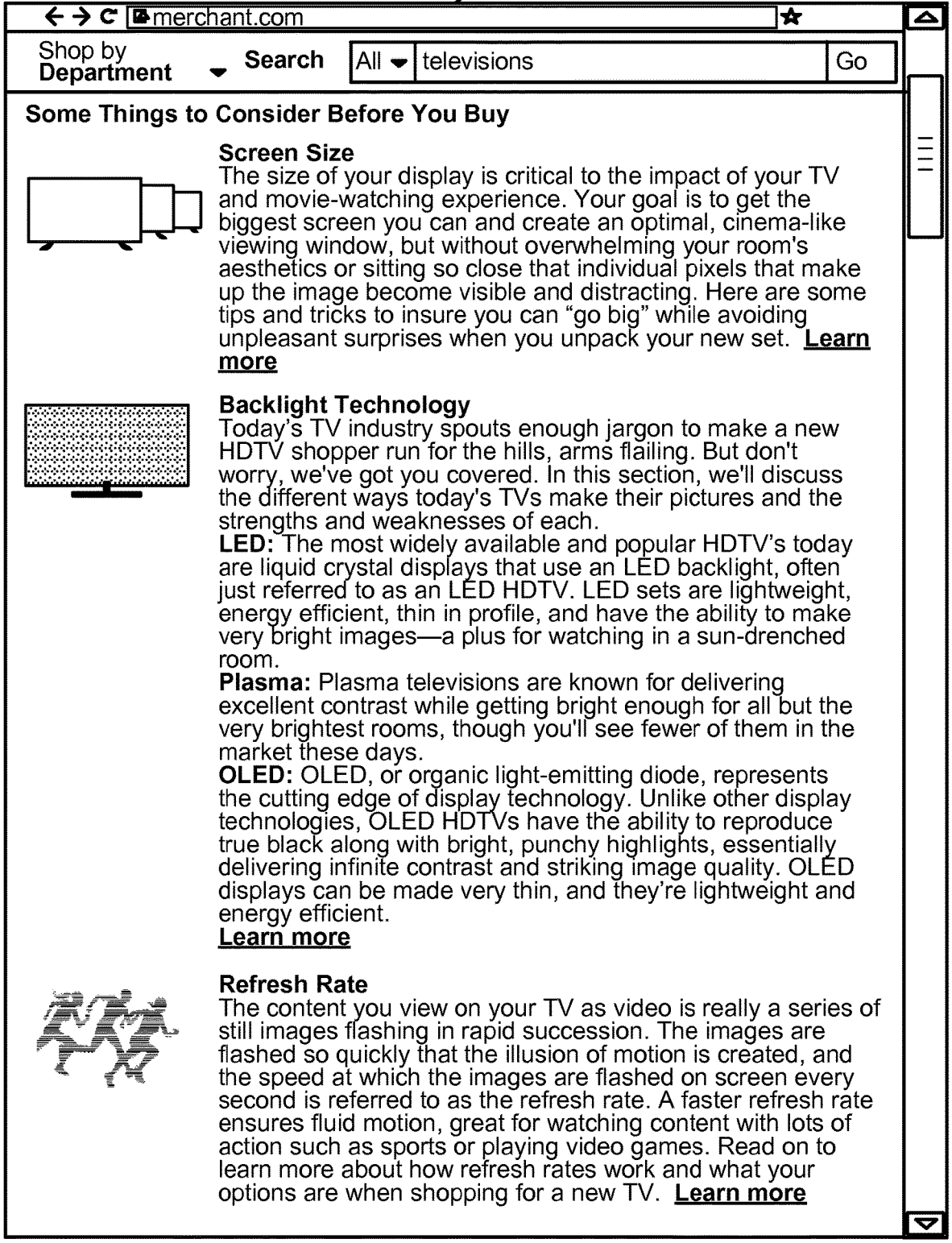
FIG. 12 illustrates an example of a notification described herein, according to at least one example.

The notification module 248 may be configured to provide a notification to the user, merchant, or electronic marketplace (e.g., as explained in more detail in association with at least FIGS. 10-12). The notification may include information about items, an advertisement, recommendation, item or list of items, or other information associated with the cluster or shopping mission. In some examples, the notification module 248 is configured to update the display on the network page to assist the user in their shopping mission.

The ranking module 250 may be configured to rank shopping missions associated with the user (e.g., as explained in more detail in association with at least FIGS. 10-12). For example, a reminder may be provided to the user for a particular shopping mission that is incomplete. To avoid annoying the user (or for other reasons), the shopping mission may be ranked lower than other incomplete shopping missions. In some examples, the shopping mission associated with the notification may correspond with a higher decay value than other shopping missions, so that the ranking of the shopping mission is lower based in part on the decay value.

Figure 3:
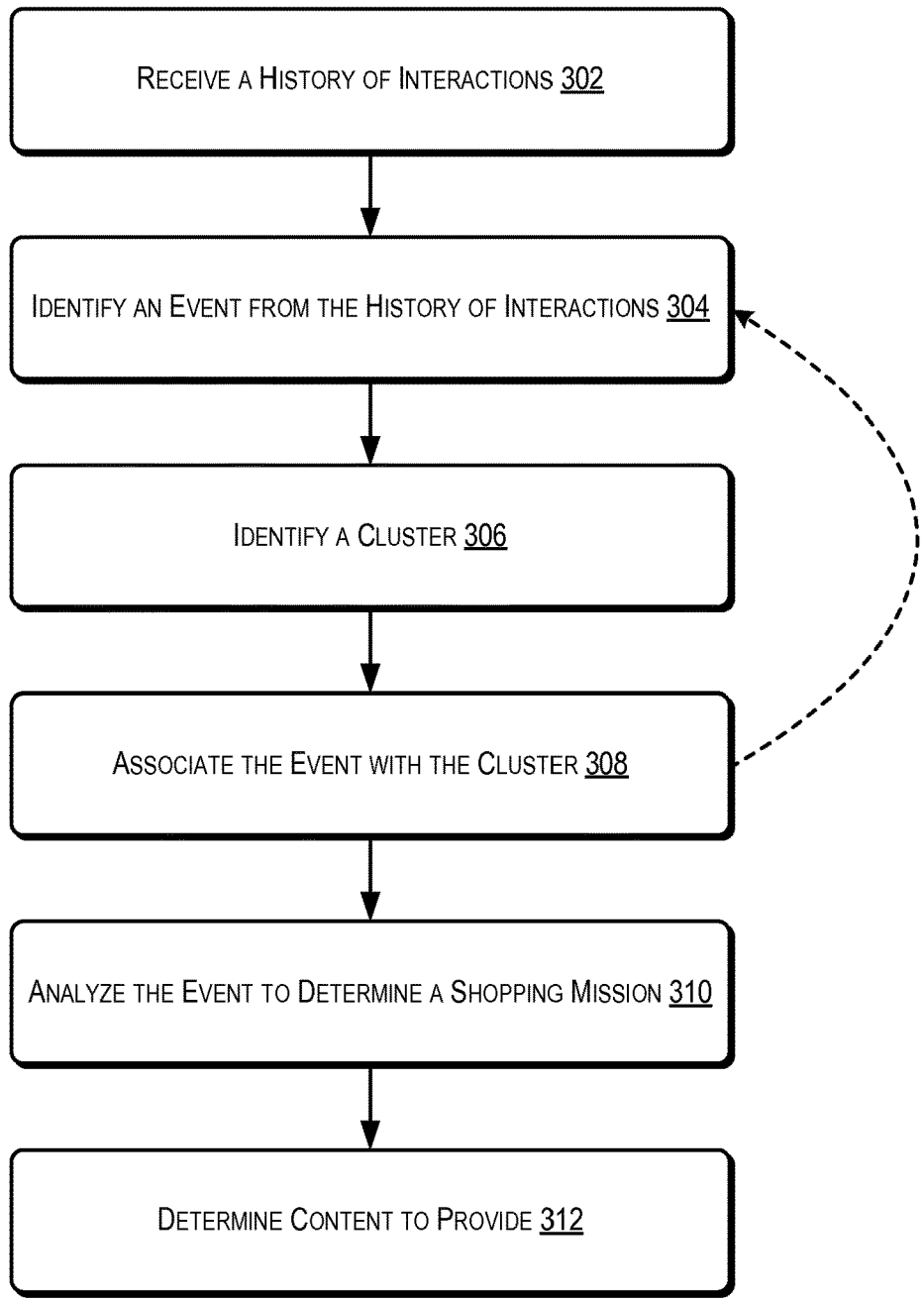
FIG. 3 illustrates an example flow diagram for associating one or more interactions with a cluster of interactions or a shopping mission described herein, according to at least one example.
Figure 4:
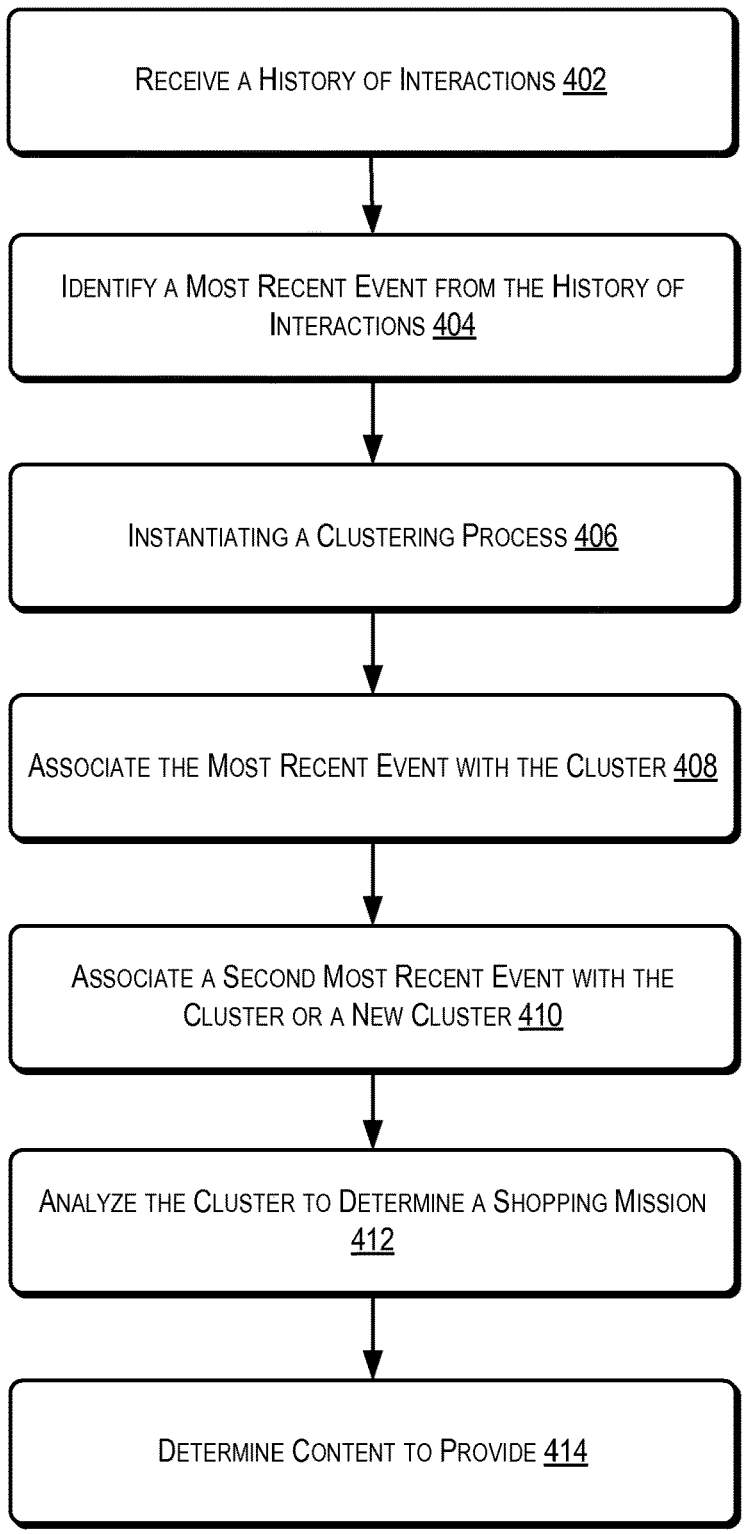
FIG. 4 illustrates another example flow diagram for associating one or more interactions with a cluster of interactions or a shopping mission described herein, according to at least one example.

FIGS. 3-4 illustrate example flow diagrams showing processes 300 and 400, as described herein. Processes 300 and 400 are illustrated as a logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the process.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, FIGS. 3-4 can illustrate at least portions of a different clustering process (e.g., one that clusters in a forward direction from the first event and one that clusters in a backward direction from the most recent event, clusters that are saved or not saved/persisted in memory, etc.). For example, an illustrative flow may receive the history of interactions, start clustering from the first event (or any event in the history), and then move forward through the events of the history based on time (e.g., in chronological order) to cluster in a forward direction. Once all of the historical events are clustered, the process may continue to add events to appropriate clusters as they are received and/or identified (e.g., continuing to cluster in a forward direction). Similarly, or alternatively, the forward direction processing may process the historical events in any order, but then process each new event in the order they are received, thus still clustering in a forward direction. Alternatively, the illustrative flow may receive the history of interactions (which may include all the current events including the most recent event), and may begin clustering items, starting from the most recent event (or any event that is not the oldest), in a backward direction. In some examples, this may include beginning with the most recent event and clustering the second most recent event next, and so on (e.g., in a backward direction). Other events may be identified as well (e.g., the oldest event as the first event, the first event received in a day even though the session lasts for multiple days, months, years, etc.). In some cases, the backward direction and/or the forward direction clustering may be performed online (e.g., on the fly and/or in real-time) such that the clusters are not stored in memory, but are created as the events are clustered, are used for determining mission information, and then are lost until the next mission determination request.

The storage of these clustering processes may differ as well. For example, a forward clustering process may store the clusters (e.g., throughout the session), whereas a backward clustering process may not store the clusters at all (or may only store in them non-persistent memory such as, but not limited to, RAM or cache, or not store the clusters after the backward clustering process ends). For example, the backward clustering process may be instantiated (e.g., in response to a request for mission information, in response to a trigger, etc.) and start to store clusters (e.g., in a temporary storage) only while the clustering processing is ongoing. Once the backward clustering process identifies the clusters, identifies the shopping mission, provides a notification, etc., the clusters may be removed or deleted from storage (e.g., until another clustering process is instantiated).

In a sample illustration of a backward clustering process, a clustering process may be instantiated to identify one or more users that are involved in a science-fiction book shopping mission. The clustering process may receive a history of interactions for one or more users and, starting with an event (e.g., the most recent event) for the first user, associate each of the events into a cluster in a chronologically backward direction. In some examples, only the events associated with science-fiction books may be clustered. In the aggregate, information about the users that are associated with this particular shopping mission may be identified for further analysis (e.g., to identify whether there is a need to offer additional science-fiction books to these users, to identify when users are close to ordering related books, to identify whether and/or when to provide a coupon to finalize the order, etc.).

FIG. 3 illustrates an example flow diagram for associating one or more interactions with a cluster of interactions or a shopping mission described herein, according to at least one example. In some examples, the one or more grouping management computers 210 (e.g., utilizing at least one of the interaction module 236, clustering module 242, shopping mission module 244, and/or notification module 248) or one or more user devices 204 shown in FIG. 2 may perform the process 300 of FIG. 3. The process 300 may begin at 302 by receiving a history of interactions (e.g., as explained in more detail in association with at least FIG. 5). For example, the grouping management computers 210 may determine, receive, analyze, reference, or otherwise access a history of interactions between a user and one or more network pages.

Figure 6:
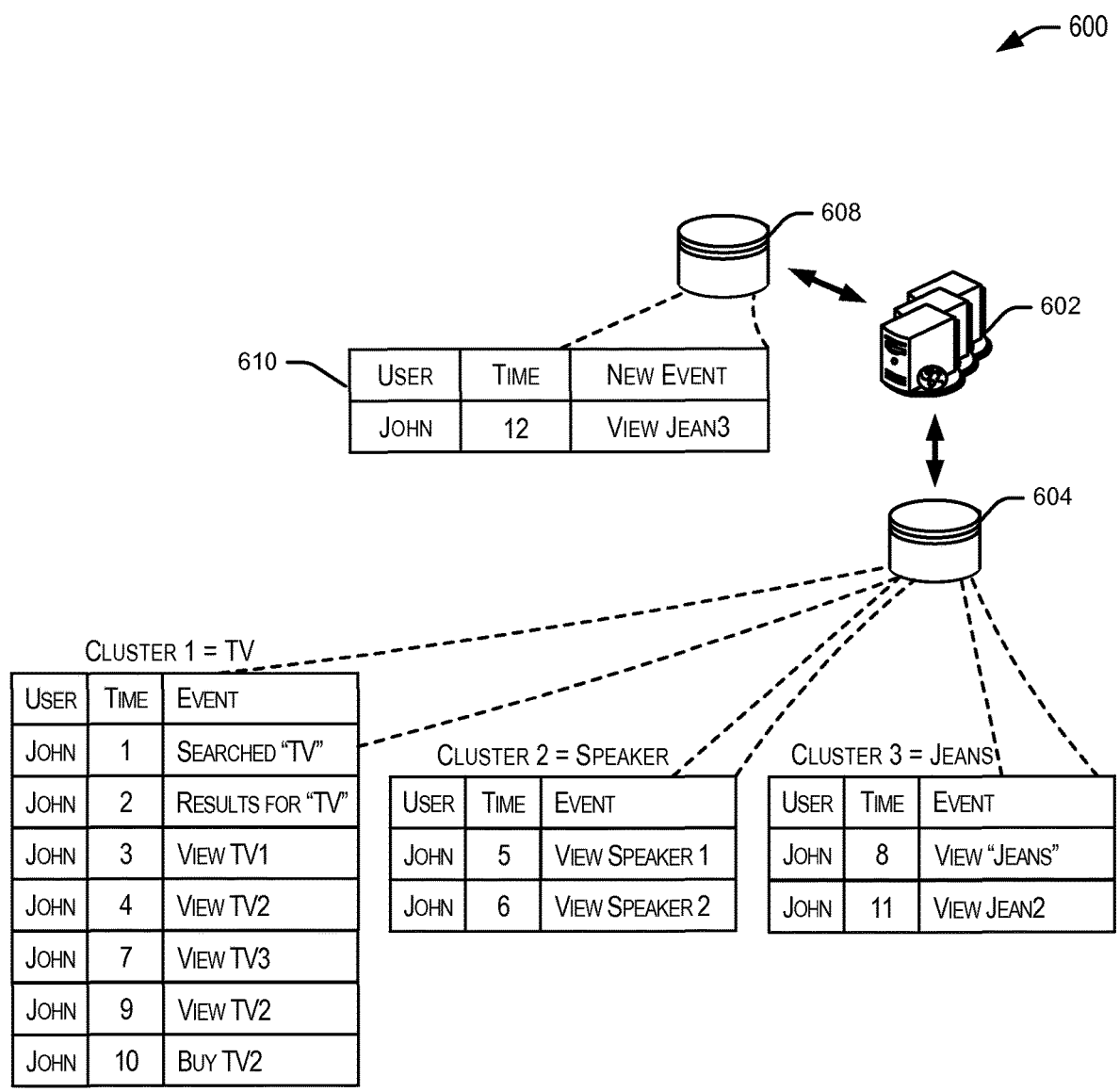
FIG. 6 illustrates some examples of identifying a cluster described herein, according to at least one example.

At 304, an event may be identified from the history of interactions (e.g., as explained in more detail in association with at least FIG. 6). The event may be the most recent event, second most recent event, first event, second event, or any other event identified in the history of interactions. For example, the grouping management computers 210 may access the history of interactions, review the time of one or more of the interactions, and identify the event based in part on the time of the interaction. In some examples, the history of interactions may be ordered by time, so that the grouping management computers 210 can identify the chronological order of the events in the history of interactions. The event can include a category as well, where the category can relate to item attributes associated with the item presented on the at least one of the one or more network pages.

At 306, a cluster may be identified (e.g., as explained in more detail in association with at least FIGS. 6-9). For example, the grouping management computers 210 may identify a cluster that includes other events from the history of interactions. The other events may be of a same category as the event.

At 308, the event may be associated with the cluster (e.g., as explained in more detail in association with at least FIGS. 6-9). For example, the grouping management computers 210 may add the event to the cluster (e.g., by adding a flag that associates the event with the cluster in a data store, by linking the event with the cluster based in part on the description, categorization, or other identification of the cluster or event, etc.). In some examples, the event can be amended to include a flag, identifier, or other information to associate the event with the cluster.

In some examples, additional events may be identified from the history of interactions and/or associated with clusters. For example, after 308, the process 300 may return to 304 to identify additional events from the history of interactions. The order of identified events may vary, including starting with a most recent event first and proceeding backwards in time (e.g., to a second most recent event or some older event), or starting with another event in the history of interactions and proceeding to events that occurred later in time. In some examples, the events may be identified based in part on a category, and the process 300 may identify events that match the category instead of or in addition to sequentially identifying events. After the next event is identified, for example, the process 300 may proceed to 306 to identify a cluster for the event, and so on.

Clustering may be implemented using any method described herein (e.g., using categorization techniques, clustering algorithms, through a heuristic classifier or heuristic classification method, determining a pairwise distance between two clusters/shopping missions, comparison with a threshold, fuzzy clustering, etc.) or any method known in the art. The clustering may correlate an event with only one cluster, or in some examples, correlate an event with multiple clusters. The event may correspond with the one or more clusters based in part on a probability determined by a probabilistic model (e.g., as described herein). In some examples, an identifier associated with the event may be stored with an identifier associated with the cluster in a data store, or other methods of including a flag, identifier, or other information to associate the event with the cluster.

In some examples, the event may optionally be associated with the cluster to determine a shopping mission associated with the cluster. The process may also optionally determine content to provide to the user based at least in part on a state of the user with respect to the identified shopping mission.

At 310, the may be analyzed to determine a shopping mission (e.g., as explained in more detail in association with at least FIGS. 6-9). For example, the grouping management computers 210 may analyze the event associated with the cluster (e.g., using the category of the item, the category of the cluster, the number of interactions associated with the cluster, a description associated with the item or cluster, etc.) to determine a shopping mission associated with the cluster.

At 312, content may be determined (e.g., as explained in more detail in association with at least FIGS. 10-12). For example, the grouping management computers 210 may determine content to provide based at least in part on a state of the user with respect to the identified shopping mission.

As described herein, FIG. 3 illustrates one example of a clustering process. This clustering process may identify events in a forward process based in part on the time associated with the event. While examples may be provided with reference to the first event, least recent event, etc., the process illustrated with FIG. 3 can begin anywhere other than the most recent event, and it may not need to cluster all of the events identified from the history of interactions sequentially (e.g., in order).

FIG. 4 illustrates another example flow diagram for associating one or more interactions with a cluster of interactions or a shopping mission described herein, according to at least one example. In some examples, the one or more grouping management computers 210 (e.g., utilizing at least one of the interaction module 236, clustering module 242, shopping mission module 244, and/or notification module 248) or one or more user devices 204 shown in FIG. 2 may perform the process 400 of FIG. 4. The process 400 may begin at 402 by receiving a history of interactions (e.g., as explained in more detail in association with at least FIG. 6). For example, the grouping management computers 210 may determine, receive, analyze, reference, or otherwise access a history of interactions between a user and one or more network pages. The history of interactions may include a set of events and/or associated information (e.g., metadata) that correspond to user interactions with electronic content (e.g., an electronic marketplace or the like).

In some examples, the process 400 may begin with a trigger or request to initiate a clustering process. For example, an interaction with a network page may trigger the instantiation of the clustering process (e.g., when the user searches for an item, at a particular time of an interaction, an interaction with a particular category of item, etc.). The trigger may be received by the grouping management computers 210 from the network page and/or the network page may transmit the trigger to the grouping management computers 210 based in part on the interaction between the user and the network page. In another example, the request may be associated with the grouping management computers 210 requesting information about a user and/or user interactions. The request may include a request to identify the interactions with network page(s) associated with a user, so that the grouping management computers 210 may analyze the interactions (e.g., to determine whether to provide a notification and/or content to the user, etc.). In some examples, the grouping management computers 210 may transmit the request to a data store associated with the grouping management computers 210 (e.g., to gather information about the user, to identify clusters and/or shopping missions associated with a user, etc.).

At 404, a most recent event (or at least an event other than the oldest) may be identified (e.g., as explained in more detail in association with at least FIG. 6). For example, the most recent event may be identified from the history of interactions. The most recent event may be identified based in part on the time of the interaction. The event may be the most recent event, second most recent event, second event, or any other event identified in the history of interactions. For example, the grouping management computers 210 may access the history of interactions, review the time of one or more of the interactions, and identify the event based in part on the time of the interaction. In some examples, the history of interactions may be ordered by time, so that the grouping management computers 210 can identify the chronological order of events in the history of interactions. The event can include a category as well, where the category can relate to item attributes associated with the item presented on the at least one of the one or more network pages.

Figure 7:
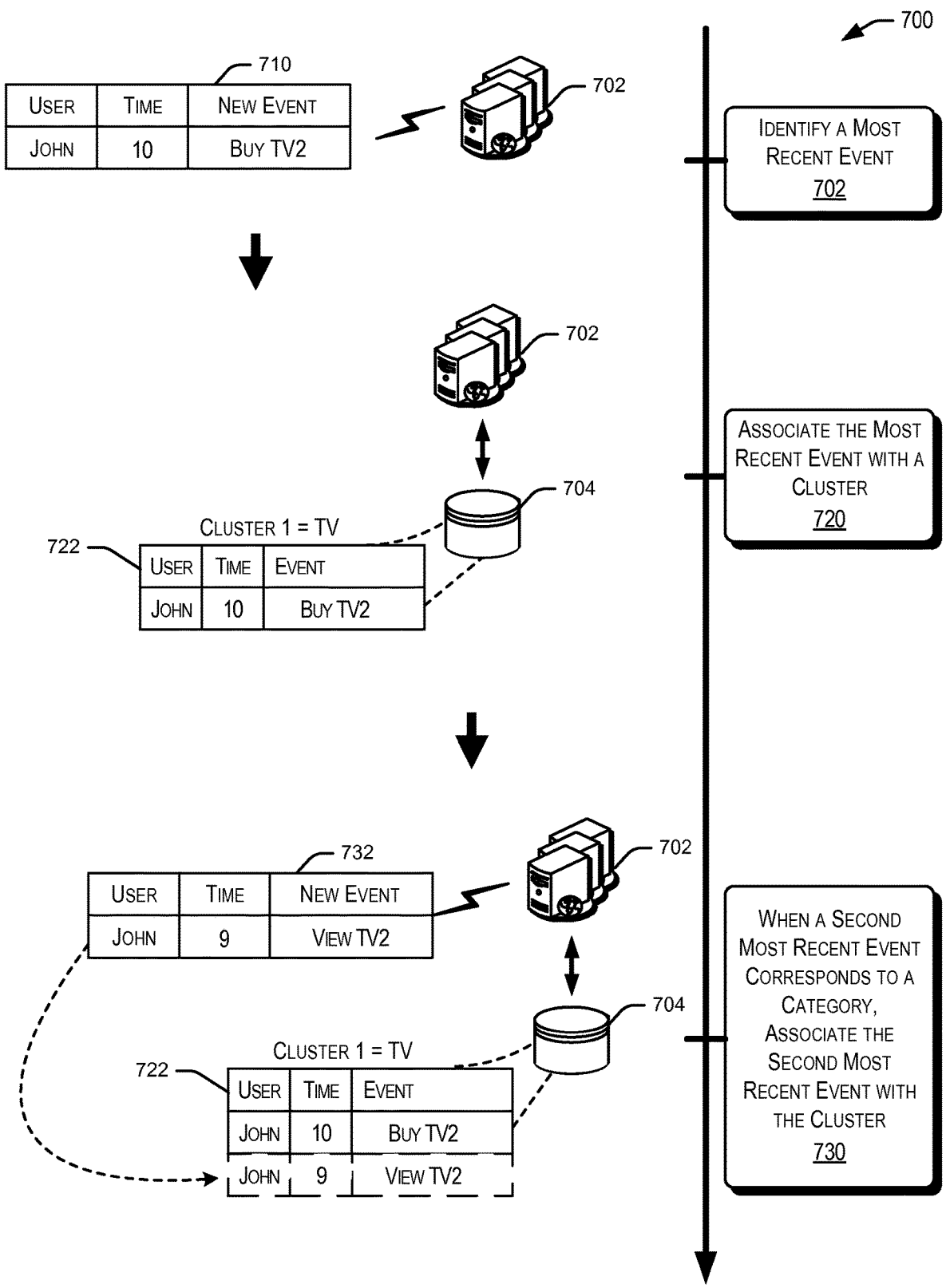
FIG. 7 illustrates an example flow for associating one or more interactions with a cluster of interactions or a shopping mission described herein, according to at least one example.

At 406, a clustering process may be instantiated (e.g., as explained in more detail in association with at least FIG. 7). For example, the grouping management computers 210 may start the clustering process with the most recent event from the history of interactions and identify a plurality of clusters that include other events from the history of interactions that are of a same category for each of the plurality of clusters. The other events may be of a same category as the most recent event.

In some examples, the clusters for a user may not exist before the clustering process is instantiated. For example, the grouping management computers 210 may instantiate the clustering process dynamically, in response to a request or trigger, at a particular time, and the like. In some examples, the data store associated with the grouping management computers 210 may not store the clusters at all, or at least not until the clustering process has been instantiated.

At 408, the most recent event may be associated with a cluster (e.g., as explained in more detail in association with at least FIGS. 6-9). For example, the grouping management computers 210 may add the event to the cluster. In some examples, the most recent event can be amended to include a flag, identifier, or other information to associate the event with the cluster.

In some examples, an older event (e.g., the second most recent event) may be identified (e.g., as explained in more detail in association with at least FIG. 6). For example, the grouping management computers 210 may identify the second most recent event using a similar method as the grouping management computers 210 used to identify the most recent event (e.g., through the history of interactions, based in part on the time of the interaction, etc.).

At 410, the older event (e.g., a second most recent event) may be associated with the cluster (e.g., as explained in more detail in association with at least FIGS. 6-9). For example, if the older event corresponds to the category of the most recent event (or the last event processed), the grouping management computers 210 may associate the older event with the cluster associated with the most recent event. Alternatively, if the older event corresponds to a different category than the most recent event, the older event may be associated with a different cluster. However, in some examples, even with the same category, the older event may be associated with a different cluster or a new cluster.

At 412, a the cluster may be analyzed to determine a shopping mission (e.g., as explained in more detail in association with at least FIGS. 6-9). For example, the grouping management computers 210 may analyze the most recent event, the second most recent event, or other events described throughout the specification that may be associated with the cluster (e.g., using the category of the item, the category of the cluster, the number of interactions associated with the cluster, a description associated with the item or cluster, etc.) to determine a shopping mission associated with the cluster.

At 414, content may be determined (e.g., as explained in more detail in association with at least FIGS. 10-12). For example, the grouping management computers 210 may determine content to be provided based at least in part on a state of the user with respect to the identified shopping mission.

As described herein, FIG. 4 illustrates one example of a clustering process. This clustering process may identify events in a backward process based in part on the time associated with the event. While examples may be provided with reference to the most recent event, second most recent event, etc., the process illustrated with FIG. 4 can begin anywhere other than the first event, and it may not need to cluster all of the events identified from the history of interactions sequentially (e.g., in order).

Figure 5:
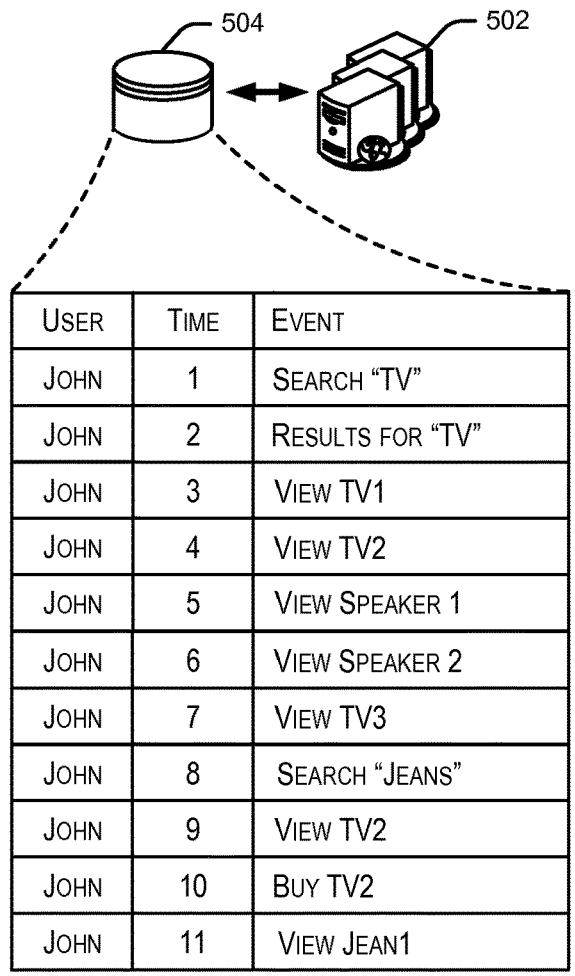
FIG. 5 illustrates some examples of a history of interactions described herein, according to at least one example.

FIG. 5 illustrates some examples of a history of interactions described herein, according to at least one example. In illustration 500, a computing device 502 interacts with a data store 504 to receive a history of interactions. Examples of the computing device 502 and data store 504 are illustrated in FIG. 2 as the grouping management computers 210 and data store 234, respectively.

The data store 504 can include a history of interactions. As illustrated, user John performs eleven actions at different time intervals. The time intervals can be 1, 2, 3, etc. that correspond with time 1:00, 2:00, time intervals 1:01, 1:02, or other intervals. At time 1, the first action, may include receiving a search request that includes the term "TV" (e.g., search "TV"). This may involve user John interacting with a network page provided by a computing device 502 associated with an electronic marketplace. The user can type or otherwise provide a search term "TV" or "television" into a search tool at the network page.

The computing device 502 can identify the interaction in a variety of ways. For example, the computing device 502 can analyze clickstream data (e.g., recorded interactions between the user and network page in a log or data store 504, including views, searches, browses, etc.), receive the search term through a transmitted message from the network page to the computing device 502 (e.g., user clicks "submit" next to the search tool and the character contents in the search tool are transmitted in a message, etc.), receive tracking cookie data from the network page, receive order or purchase history, feedback, comments, ratings, demographic or census data for the user, or other methods of data gathering known in the art.

When the search request is received, search results may be provided at time 2 (e.g., "results for 'TV'"). For example, the user may view one or more images or descriptions of televisions, data used to research televisions, or other information that can be returned from a search query.

The user may select one of the search results at time 3, where the computing device 502 provides a detail network page of the item (e.g., "view TV1"). The detail network page can include an image of the item, description of the item, merchant that provides the item (e.g., through the electronic marketplace), price, or other details associated with the item. The computing device 502 may also determine a category of the item or other item attributes from information provided on the detail network page (e.g., TV is in category "electronics," etc.). The detail network page may also include a tool for the user to provide feedback, browse through reviews, or other interactions that may be tracked and included with the history of interactions.

The user may select a different item at time 4 (e.g., "view TV2"). For example, the user may access the original list of search results (e.g., at time 2) by selecting "back" or "undo." In some examples, the user may access the different item using the detail page of the first item (e.g., TV2 may be a similar item to TV1, etc.), access information about items, an advertisement, or a notification on the detail page of the first item, select a previous search, move the different item to a viewable area on the display of the user device (e.g., so that the computing device 502 can identify the item in the viewable area on the display, etc.), or other methods that can allow the user to interact with the network page. The information about the items, for example, may be presented to the user by the computing device 502. In some examples, the computing device 502 can guide the user to the different item through a recommendation.

The user may "view speaker 1" at time 5, "view speaker 2" at time 6, and "view TV3" at time 7. Similarly with the fourth action, the user may interact with these items and/or network pages through an advertisement, notification, select a previous search, interact with a recommendation from computing device 502, and the like.

The computing device can receive a second search request at time 8, the search request including the term "jeans." The search request may be associated with a different item in a different category, a different item in the same category, or the like. Receiving the second search request may involve user John interacting with a network page provided by an electronic marketplace to type or otherwise provide a search term "jeans" into a search tool at the network page. The search tool may be accessible on the detail network page of one of the items.

The user may return to the previous search results to view "TV2" at time 9, which corresponds with the first set of search results. At time 10, the user may buy "TV2" (e.g., by electronically placing the item "TV2" into an electronic shopping cart, by ordering the item from a merchant, etc.). At time 11, the user may return to the search results associated with the second search for "jeans" to view item "Jean1" (e.g., through an detail network page, through an advertisement, etc.).

The history of interactions in data store 504 can include interactions from other users as well. For example, the other users may provide the same search queries, view the same search results, purchase the same items, or include different events or interactions than are illustrated in association with user John. The history of interactions may also include an identification of the notifications provided to the user (e.g., computing device 502 provides "advertisement 1 for TV1" at time 20, etc.) and/or interactions with those notifications. In some examples, the interactions may be sorted (e.g., by user, time, item category, etc.).

Interactions can be filtered to identify the user's interactions during a session. The user may interact with one or more network pages provided by the electronic marketplace, and the session can identify the interactions that persist after a user closes a browser application at the user device. In some examples, the session may persist until a user logs out of the browser, profile, or other application. The interactions during the session can also include interactions between the user and notifications provided by the electronic marketplace (e.g., through a read receipt identifying that the user has accessed a message) or any other events captured before the user un-identifies themself or their device with the electronic marketplace (e.g., by deleting browser cookies, by logging out of the electronic marketplace, etc.). In some examples, a session may be limited to a time of the user event (e.g., all interactions within a day, week, month, etc.).

FIG. 6 illustrates some examples of identifying a clusters described herein, according to at least one example. In illustration 600, a computing device 602 interacts with a data store 604. The data store 604 may include one or more clusters, one or more events or interactions associated with users interactions with one or more network pages. A second data store 608 may be included as well. Examples of the computing device 602, data store 604, and data store 608 are illustrated in FIG. 2 as the grouping management computers 210, data store 234, and data store 234, respectively.

The computing device 602 may identify event 610. In one sample illustration, the event may be the most recent event 610, although other events may be identified without diverting from the essence of the disclosure. The most recent event 610 can correspond with the history of interactions in the data store 604. To identify the most recent event 610, in some examples, the computing device 602 can compare the most recent time of the event with other events. As illustrated, the time associated with most recent event 610 is 12, whereas the most recent time associated with other events that correspond with cluster one, cluster two, and cluster three is 11.

In some examples, the computing device 602 identifies the most recent event 610 from a data store 608 (e.g., a data store of interactions, etc.). The data store 604 and data store 608 may be the same or different data stores. For example, the data store 604 may be a dynamic and/or temporary data store (e.g., a data store of personalization and/or recommendation information, volatile memory, cache, etc.) and the data store 608 may be a persistent data store (e.g., accessible by various computing devices to use in multiple processes and analyses, etc.). In some examples, the computing device 602 may identify the most recent event 610 dynamically (e.g., on the fly, from a temporary storage, from a persistent storage, etc.).

In some examples, the data store 604 and data store 608 may not be used for the clustering processes described herein. For example, clusters might not be stored at all (e.g., in the data store 604) or may be stored only temporarily (e.g., during the clustering). In another example, the data store 604 is non-persistent (e.g., in-memory) storage such as RAM, cache, or other temporary data storage (e.g., a data store of personalization and/or recommendation information, volatile memory, etc.). In another example, the data store 604 may be configured to not store the clusters other than while the clustering is being processed.

The computing device 602 may identify a cluster that includes other events that are of a same category as the most recent event. For example, the computing device 602 can determine that the most recent event 610 (e.g., "view Jean3") is associated with a category of "jeans" (e.g., based on item attributes presented on the network page, based on item attributes associated with the "Jean3" in the data store 604, based on the categorization of the new event as "view Jean3," based on a title or description of the cluster, etc.).

In some examples, the computing device 602 can identify a cluster for the most recent event using a clustering algorithm as shown below. For example, as illustrated in the clustering algorithm, the input may include the history of interactions for the user and the output may identify a cluster, including a first cluster when no other clusters have been created.

```
Input: A set of viewed items V = {v_i | e = [1,n]}
1.   Initiate a set of clusters and a set of view similarities with the most
     recently
     viewed item:
     C = {C_1}, where C_1 = {v_1}
     S = {CS_1}, where CS_1 = S_1
2.   For i = 2->n,
     For j = 1->|C|,
        If there is a sufficient overlap between S_i and CS j,
          Add v_i to C j, and add S_i to CS j
        Else,
          Construct a new cluster C_(|C| + 1) = {v_i} and add it to C,
     and
          Construct a new cluster SC_{|C| + 1} = S+i
Output: C
```

V and S may identify the item viewed, I and J may identify the number of the interaction or event, and C and CS may identify the cluster. For example, as illustrated in FIG. 6, the most recent event 610 is compared with cluster one to determine if the most recent event 610 is similar to cluster one (e.g., "view Jean3" is compared with "Cluster 1=TV"). If not, the most recent event 610 is compared with cluster two (e.g., "view Jean3" is compared with "Cluster 2=Speaker"). If not, the most recent event 610 is compared with cluster three (e.g., "view Jean3" is compared with "Cluster 3=Jeans"). When a similarity exists, the most recent event may be associated with the cluster (e.g., Cluster 3). If no similarity exists, a new cluster may be created.

Similarities may be measured using a variety of methods. One method of identifying a similarity is determining a pairwise distance between the most recent event and the cluster (e.g., Euclidean distance, Hamming distance, comparisons between terms in the description of the event/cluster, etc.). The most recent event may be associated with the cluster when the pairwise distance is less than a threshold.

Another method to identify a similarity is through a heuristic classifier or heuristic classification method, in order to relate events/interactions with the clusters. For example, the interaction may be abstracted and/or refined. In a sample illustration, the interaction can include "search 'Acme Co. Model 100 television price $300'." The abstraction can include "search television" or "search Acme Co." In another sample illustration, the interaction can include "search 'Acme Co. Model 100 price $300'." The refinement can add information to the interaction. For example, the refinement can include "search television" where the term "television" is not included with the original identified interaction. The added information may be determined from information available in the detail network page, data store, or other information that associates Acme Co. items with a price range and a model.

Another method of identifying a similarity is through the use of a threshold. For example, an interaction may include a description "search 'Acme Co. television Model A'" and one of the clusters in data store 604 can include "Cluster=televisions." The comparison of terms in the description of the interaction and the description of the cluster may include 95% match of one of the terms (e.g., television or televisions, or using some other threshold value). Similarly, a cluster description can include "Cluster=Acme Co. brand" which would match one of the terms above 75% similarity (e.g., Acme Co.).

A threshold may be adjusted to account for fuzzy clustering. For example, a cluster may be limited to items that are similar (e.g., through pairwise distance, heuristic classifier, etc.) above a threshold (e.g., a cluster of only televisions from a threshold above 90%). A cluster may also include items that are loosely related, so the threshold may be lowered to include additional items (e.g., a cluster of all electronics). Additional information regarding adjusting thresholds and fuzzy clustering is provided with FIG. 9.

Similarities between items may also be identified through past users' interactions or users' history. For example, a first user searches/browses for a first item and a second item during a session, and a second user searches/browses for the same first item and second item during a session. The first and second items may be similar because more than one user accesses information about the first and second items during a limited timeframe (e.g., the session). On a larger scale, the first and second items may be similar when a threshold of users search for these items (e.g., more than 50% of users, or more than one-thousand users who search for the first item also search for the second item, etc.). In some examples, the interactions between the users and the network pages may also identify similarities between items (e.g., the first user views detail network pages of the first and second items during a session, and the second item user views detail network pages of the first and second items during a session, etc.).

Similarities may also be defined through classification hierarchy (e.g., also referred to as an item categorization, item hierarchy, or item taxonomy) (used interchangeably). For example, an item may be grouped with other items that are similar (e.g., based on item attributes, etc.), such that a broader category group (e.g., "books") may include one or more sub-categories groups (e.g., "fiction," "fantasy," or "electronic books," "hard-back," etc.). An item may be associated with one or more categories, sub-categories, or other classifications. The classifications and/or categories may be one or more clusters (e.g., identified as nodes). When associated with clusters, the cluster may include the broader category, sub-category, etc. As a sample illustration, a user may view item "TV1" which can correspond with category "electronics" and view item "laptop1" which can also correspond with category "electronics." These two interactions can be associated with the same cluster (e.g., Cluster=electronics). In another illustration, the clusters may include "Cluster=television" and "Cluster=laptops." In this example, the interactions may be associated with two different clusters.

Similarities may also be defined through direct substitutions. For example, a user may add "Model A television" and "Model B television" to a wish list. In another example, the user may browse detail network pages of both items, research information associated with both items, or ultimately order "Model A television" but not "Model B television." These items may be direct substitutions for each other, based in part on the interactions with network pages associated with each item by the user. In some examples, the items may be associated with the same cluster because they are direct substitutions or substitutes for each other. The related items may be identified as such in the data store 604 (e.g., identified by model description or title, identified by a unique item number, etc.).

Similarities may also be defined through item attributes. For example, an item attribute can be identified based in part on information presented on a network page associated with the item (e.g., as illustrated by network page 108 in FIG. 1) and/or stored in the data store 604. The item attributes can include an image of the item, description of the item, information provided by one or more merchants associated with the electronic marketplace that provide the item, price, or other details associated with the item. Similarities between items can be identified by similar item attributes (e.g., similar price range, similar titles, etc.).

Similarities may also be defined through feedback. For example, one or more users may identify items as similar by transmitting a communication to the computing device 602 from a user device that identifies the similar items. In some examples, one or more merchants may identify a similarity of a group of items or cluster when the merchants offer the item to other users (e.g., as part of a registration process, when the item is uploaded or provided through a network page, when the merchant provides a title description, abstract description, detailed description, comments/feedback, etc. of the item).

In some examples, a heuristic classifier may incorporate a threshold number of overlapping items from the cluster and item attributes (e.g., more than five, more than ten-percent of the information provided, etc.). A heuristic classifier could be trained from feedback or from data gathered from expert users, merchants, or administrators. Since the approach does not require comparing all item-item pairs, but item-cluster pairs, it can identify the similarities efficiently with low latency (e.g., the time complexity of the algorithm is O(M×N), where M and N are the number of viewed items and output clusters (N much less than M), etc.).

The clustering may be performed in real-time or through an offline process. For example, the identification of the cluster for the most recent event may be performed as the user is interacting with the network page(s). In another example, the identification of the cluster for the most recent event may be performed at a particular time interval, at the end of the day, or other offline process that does not correspond with a real-time interaction of the user with one or more network pages.

FIG. 7 illustrates an example flow for associating one or more interactions with a cluster of interactions or a shopping mission described herein, according to at least one example. The process 700 can begin with receiving an event at 702. For example, a computer system 704 can identify one or more events from the history of interactions, including an event 710 (e.g., the most recent event).

At 720, the event 710 may be associated with a cluster. For example, the computer system 704 can identify a category associated with the event 710 and determine whether one or more clusters exist that are associated with that category. If so, the event 710 may be associated with that cluster. If not, the event 710 may be associated with a new cluster. As illustrated, the event 710 may be associated with new cluster 722 associated with the category "TV."

At 730, when an earlier event 732 corresponds to a category (e.g., the second most recent event), the earlier event 732 may be associated with the cluster. For example, the computer system 704 can identify a category associated with the earlier event 732 and determine whether one or more clusters exist that are associated with that category. If so, as illustrated with cluster 722, the earlier event 732 may be associated with that cluster.

In some examples, the clusters may not be stored and/or persisted. For example, once the clustering process is instantiated, the clustering process may begin without any clusters. When the first event is identified, the first event may be associated with a first cluster (e.g., since no other clusters have been created). When the second event is identified (e.g., the event 710, the most recent event, earlier event 732, another event in the history of interactions, etc.), the clustering process may determine if the second event should be clustered with the first event (e.g., based in part on a category of the second event and first event). If not, the second event may be associated with a second cluster (e.g., since only the first cluster has been created and no other clusters have been created other than the first cluster).

In some examples, the clusters may be identified based in part on a request or trigger. The request or trigger may instantiate a clustering process. For example, a computer system 704 can receive a request to instantiate a clustering process. The computer system 704 may then identify an event from the history of interactions and proceed to form the clusters and described throughout the disclosure.

Figure 8:
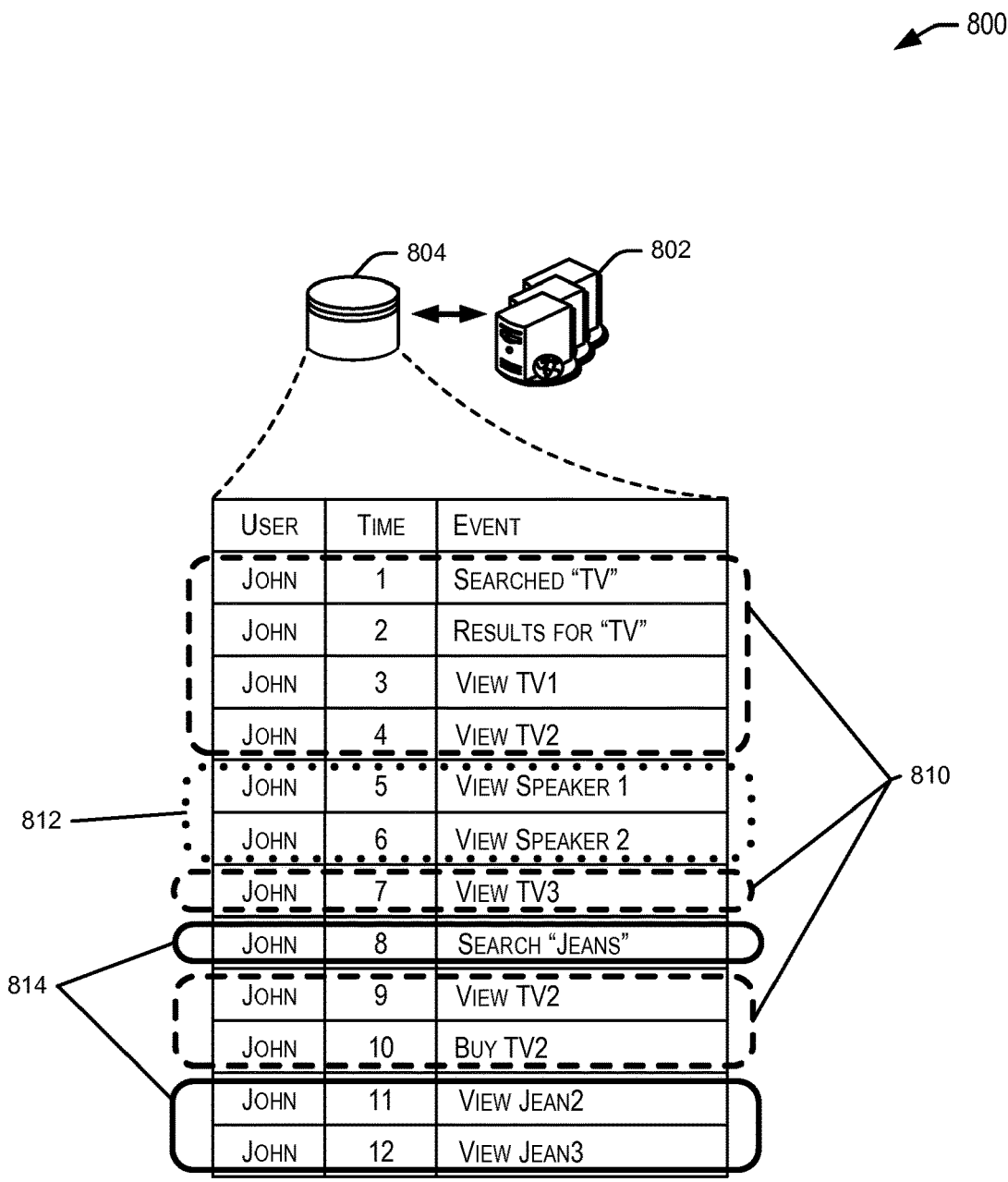
FIG. 8 illustrates some examples of identifying a cluster and/or shopping mission described herein, according to at least one example.

FIG. 8 illustrates some examples of identifying a cluster and/or shopping mission described herein, according to at least one example. In illustration 800, a computing device 802 interacts with a data store 804, which includes one or more clusters. Examples of the computing device 802 and data store 804 are illustrated in FIG. 2 as the grouping management computers 210 and data store 234, respectively.

As illustrated, the history of interactions and most recent event are associated with the clusters in the data store 804. "Cluster 1=television" 810 includes interactions at times 1, 2, 3, 4, 7, 9, and 10. "Cluster 2=speaker" 812 includes interactions at times 5 and 6. "Cluster 3=jeans" 814 includes interactions at times 8, 11, and 12 (e.g., the most recent event). In some examples, clusters may be combined or abstracted (e.g., cluster=television and cluster=speakers may be combined into cluster=entertainment center, etc.), as discussed with FIG. 9.

A shopping mission may correspond with a cluster. For example, a user associated with the three clusters illustrated in FIG. 8 may also correspond with three shopping missions. The description or title of a cluster (e.g., "television" or "speakers") may also be a description or title of a shopping mission. In some examples, the user may be ultimately interested in purchasing three items, including a television, speakers, and jeans.

A shopping mission may be determined by one or more clusters (e.g., one-to-one relationship between a cluster and shopping mission, or many clusters combined into one shopping mission, etc.). The shopping mission may be determined in a similar way to the identification of a cluster (e.g., using categorization techniques, clustering algorithms, through a heuristic classifier or heuristic classification method, determining a pairwise distance between two clusters/shopping missions, comparison with a threshold, fuzzy clustering, etc.), as discussed with FIG. 6.

A shopping mission may be adjusted based on an identification of additional interactions, events, or clusters. For example, a shopping mission can include a single cluster (e.g., cluster="Acme Co. Movie, Episode 2"). After submitting a search request for the item, browsing, and purchasing the item, the shopping mission may be determined to be complete (e.g., shopping mission="Acme Co. Movie, Episode 2"). Later, the user may search for another item that may be related (e.g., by category, description, etc.), which might form a second cluster (e.g., cluster="Acme Co. Movie, Episode 1"). A second shopping mission may be identified to include this different single cluster (e.g., shopping mission="Acme Co. Movie, Episode 1"). An audit (e.g., analysis process performed by the computing device 802, etc.) may determine that the first shopping mission was in fact not complete, and combine the two shopping missions into a single shopping mission. The computing device 802 may determine that the original shopping mission is broader than originally determined (e.g., shopping mission="Acme Co. movies" or shopping mission="Acme Co. items").

The analysis of the shopping mission may be performed using a variety of methods. For example, the descriptions or titles of the cluster and shopping mission may be compared using a word comparison or parsing algorithm (e.g., cluster="Acme Co. movies" and cluster="Acme Co. books" are part of a shopping mission="Acme Co. items" based on an identified word part in the description or title of the cluster, etc.).

In some examples, a depth of a shopping mission may be identified from the information in the cluster(s). A mission depth may be calculated (e.g., minimum number of user interactions divided by an average number of interactions for the shopping mission, etc.). As an illustration, the first interaction related to "television" (e.g., the user submits a first search query for "HD televisions") can identify a low depth of a shopping mission and a purchase of a television can identify a high depth of a shopping mission. For example, a higher depth may correspond with fewer interactions away from a purchase (e.g., examples of the interaction associated with a high depth include adding an item to an electronic shopping cart, reviewing detail network pages for only one item, etc.) or the user is closer to a purchase of an item associated with the cluster. A lower depth may correspond with an initial interaction (e.g., examples of the interaction associated with a low depth include submitting a search query that is unrelated to other clusters during a session, etc.) or the user is farther from a purchase of an item associated with the cluster.

A computation of the depth of a shopping mission may correspond with other events or the history of interactions. For example, at time 1, a search request is received that includes the term "TV" (e.g., search "TV") and at time 8, another search request is received that includes the term "jeans" (e.g., search "jeans"). Even though these two interactions include searching, the depth of each shopping mission may be different. Some factors that may affect the depth include an average number of interactions prior to purchase of other users on the same or similar shopping mission (e.g., users on average interact with network pages twenty times before purchase for the "television" shopping mission, etc.), an average number of interactions for a particular item or category of items (e.g., users on average interact with network pages fifty times before purchase for the "electronics" category, etc.), or a known rate of completing shopping missions for the user based on previous shopping missions (e.g., this user on average interacts with network pages less than five times before purchasing an item associated with the shopping mission, etc.).

The shopping mission may be complete or incomplete. For example, when the most recent event includes ordering the item or adding the item to an electronic shopping cart, the computing device 802 may determine that the shopping mission is complete. In another example, when the most recent event includes submitting a search query or querying a different item of the same category as the item, the computing device 802 may determine that the shopping mission is incomplete.

A shopping mission may be determined to be complete (e.g., corresponding with a depth of a shopping mission, etc.) by the computing device 802 using a probabilistic model or predictive model (used interchangeably). In some examples, the probabilistic model may use a simple or heuristic classification. For example, the computing device 802 may determine that a purchase of an item may determine that a shopping mission is complete, may determine that the shopping mission is incomplete, or may determine that the shopping mission is ongoing.

As a sample illustration, a "book" shopping mission may be identified. The determination of whether the book shopping mission is complete, ongoing, or incomplete may be based in part on the category associated with the shopping mission and/or cluster (e.g., book, entertainment, etc.). In some examples, the shopping mission may not be complete based on this category, since some users will likely purchase another book in the future. The computing device 802 may determine this instance to be an example of an ongoing or incomplete mission.

The shopping mission may be identified as complete in response to various events. For example, the shopping mission may be identified as complete when an item is added to an electronic shopping cart, when the user provides payment information to purchase an item, when the computing device 802 provides a network page in response to a purchase (e.g., a thank you page, a purchase confirmation page, etc.), or other events identified from the history of interactions. Events may be associated with a complete shopping mission in an ongoing process (e.g., based on a learning model, based on other user's interactions, etc.). For example, the probabilistic model may identify that 50% of shopping missions are complete when the item is added to an electronic cart (e.g., before the purchase), and the shopping missions that involve this event, based on the threshold, may be considered complete.

The shopping mission may be identified as ongoing or incomplete in response to various events. For example, a user may search for and purchase an item on January 1st (e.g., based in part on an identification of one or more interactions with a network page) and return to the network page on January 2nd to search for the item that they purchased. The search for the item on January 1st may indicate an incomplete shopping mission, whereas the same search for the same item on January 2nd may indicate an ongoing or complete shopping mission (e.g., the user simply wants to find information about the recently purchased item, etc.). The computing device 802 may determine (e.g., using the probabilistic model, etc.) that the user's shopping mission is ongoing or incomplete based in part on the time between the events (e.g., one day after the purchase signifies that the mission is ongoing, five days after the purchase signifies that the user will return the item and wants a different item so the shopping mission is incomplete, etc.) or the type of mission (e.g., the user purchases several books per month, so the purchase of one book does not equate to a complete mission but rather an ongoing or incomplete shopping mission, etc.).

The probabilistic model may incorporate a profile of the user to determine information about the shopping mission. For example, a user may be identified as a user who purchases several books. When one book is purchased, the shopping mission associated with this user may be identified as ongoing, whereas a book purchased by another user who does not purchase several books (e.g., may be searching for a gift for someone, etc.) may be identified as complete.

The probabilistic model may incorporate features about the user from the profile with the determination of the depth of the shopping mission. The probabilistic model may identify the category associated with the shopping mission and/or cluster, events associated with the shopping mission (e.g., identified in the cluster(s), etc.), user or profile associated with the mission, and other information associated with the shopping mission in order to determine whether the shopping mission is complete, incomplete, or ongoing.

The probabilistic model may provide a probability that an event or interaction associated with a user was part of an incomplete mission, part of a previously closed mission, part of a new mission, or not part of a mission at all. For example, the probabilistic model may identify that 50% of shopping missions are complete when the item is added to an electronic cart (e.g., before the purchase), and the shopping missions that involve this event, based on the threshold, may be considered complete. In another example, the probabilistic model may identify that 75% of shopping missions are ongoing when the profile of the user identifies the user as a collector of a category of items and an item added to an electronic shopping cart is associated with that category. When the profile associated with the user identifies these two facts (e.g., the collector and the event, etc.), the shopping mission associated with this user may be ongoing. If the profile does not identify these two facts, the shopping mission may be incomplete or otherwise.

In some examples, the probabilistic model may provide a probability that an event or interaction is part of a particular mission. For example, the profile of the user may identify a time range associated with ordering items. The user may research a television on day one, continue to research the particular television and search for other television on day two, not interact with network pages on day three, and purchase the original television on day four. The user may be associated with an average search to purchase time range of four days. When the user interacts with other items on the first day and purchases an item on the fourth day (e.g., researches speakers and televisions on the first day and purchases a television on the fourth day, etc.), the probabilistic model may determine that the shopping mission is a combined shopping mission for electronics instead of a shopping mission for a television and a shopping mission for speakers (e.g., based in part on the four-day time range for the user). Other probabilistic models may be implemented to correlate an event with a shopping mission without diverting from the scope of the disclosure.

Figure 9:
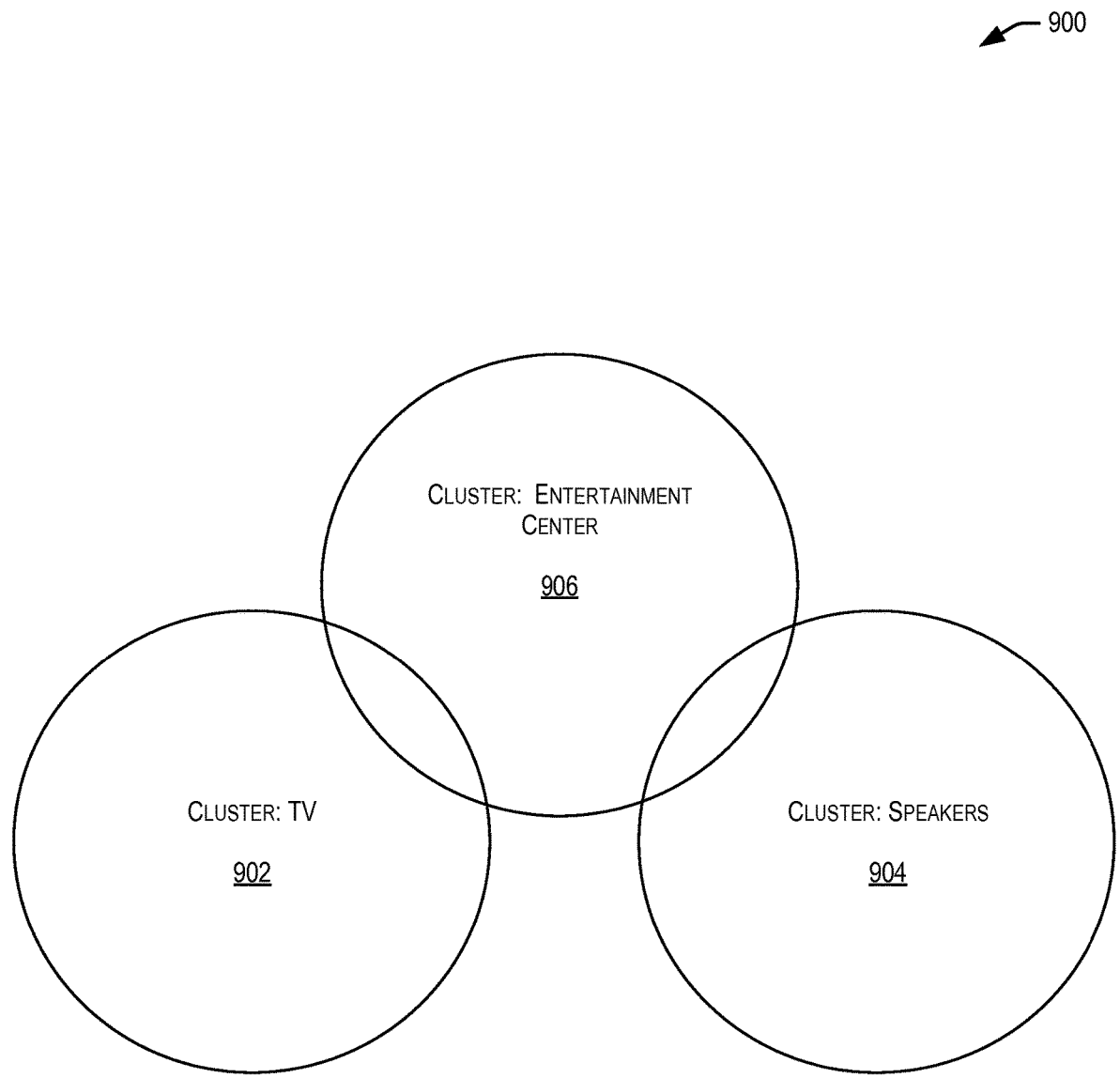
FIG. 9 illustrates an example of identifying a cluster described herein, according to at least one example.

FIG. 9 illustrates an example of identifying a cluster described herein, according to at least one example. In illustration 900, data store (not shown) includes a first cluster 902, second cluster 904, and a third cluster 906. The first cluster 902 may be associated with "television," second cluster 904 may be associated with "speakers," and third cluster 906 may be associated with "entertainment center."

The cluster may be identified using fuzzy clustering. For example, one or more grouping management computers 210 can implement fuzzy clustering in order to identify a broader or narrower cluster than the process identified in FIG. 6. As illustrated, fuzzy clustering may identify one cluster from the two or more distinct clusters (e.g., identifying third cluster 906 associated with an entertainment center, from distinct first cluster 902 and second cluster 904). Fuzzy clustering may identify the third cluster 906 in a hierarchy of clusters (e.g., an entertainment center cluster may comprise items related to both televisions and speakers, etc.).

The cluster may correspond with a collection of items rather than a single item (e.g., "kitchen refurbish" cluster rather than "new cabinets" cluster or "knobs" cluster, etc.). The cluster may correspond with a brand or franchise, where the user may attempt to collect multiple items in the franchise (e.g., Acme Co. movie, t-shirts, toys, books, etc.).

Fuzzy clustering may consider the depth of the shopping mission when determining the specificity level for the cluster(s). For example, a user that browses for books frequently (e.g., more than a threshold, more than 100 books in a month, etc.) can be associated with a deeper mission depth, even when the user submits a new search request for an item associated with a different cluster. As a sample illustration, the user may be associated with clusters "fiction books" and "sci-fi books" based on a history of interactions. When the user provides a search request including "search 'John Smith latest non-fiction book'," the most recent event may not correspond with the existing clusters. In this example, the clusters may be combined to create one cluster (e.g., "cluster=books") or create a new cluster (e.g., "cluster=non-fiction") as described with FIGS. 6-7.

The computing device may implement a merge or audit process. For example, once one or more clusters are identified for a session, the process can review the clusters, determine whether a broader description of at least two of the clusters can identify both clusters, and, if a broader description is available, combine the two clusters to form one, combined cluster. In another example, the clusters may be identified as part of a broader shopping mission (e.g., "kitchen refurbish" cluster rather than "new cabinets" cluster or "knobs" cluster, or "cluster=Acme Co." for all related movie, t-shirts, toys, and books from the brand, etc.).

The merge or audit process may also include min-hashing/locality sensitive hashing. For example, the shopping mission may be represented by a description or identifier. The computing device can identify common descriptions or identifiers, so that when these descriptions or identifiers are present in the identified shopping missions (e.g., as identified as related in the data store), the shopping missions may be combined on the previously-identified correlation. This may be computed in O(M) and/or offline. In some examples, min-hashing/locality sensitive hashing may be used to combine clusters (e.g., before shopping missions are identified) so that the process of combining shopping missions is more efficient.

FIGS. 10-12 illustrate examples of notifications described herein, according to at least one example. For example, as illustrated in FIG. 10, illustration 1000 shows two network pages that provide notifications to the user. A comparison of a network page with and without identifying a shopping mission is shown, including a first network page 1010 (e.g., without identifying one or more shopping missions) and second network page 1020 (e.g., with identifying one or more shopping missions). In some examples, the first network page 1010 and second network page 1020 may present one or more items to a user.

The first network page 1010 includes a list of items associated with initial interaction(s) of a user with a network page during a session (e.g., "search 'televisions'"). The items may be displayed in any order, with or without highlighting relevant items for the user. The second network page 1020 can include one or more notifications based on a history of interactions and clusters associated with the user. The second network page 1020 may be personalized for the user based in part on the shopping mission(s) associated with the user (e.g., personalized search/browse network page, detail network page, search results network page, etc.). For example, the user may search for "television," view detailed network pages about items "television 1" and "television 2," and research "television 3" through interactions with one or more network pages.

The personalization of the second network page 1020 may vary. For example, search results may be adjusted (personalized) based on an identified shopping mission for a user. As an illustration, the user may be associated with a first shopping mission for a liquid crystal display (LCD) television and a second shopping mission for a Universal Serial Bus (USB) device. Without the identification of these shopping missions, a search request for "television" may simply provide one or more items from one or more merchants that offer televisions for purchase. With the identification of these shopping missions, the search results may be adjusted to include more LCD televisions than non-LCD televisions and/or accessories that accompany or are regularly ordered with items of the search results, including USB devices. In some examples, the adjustment of the search results personalizes them to provide items to users that are particularly tailored to the user based in part on one or more ongoing missions.

As illustrated in FIG. 10, the second network page 1020 can include a notification that identifies the best-selling items associated with the "television" shopping mission (e.g., Acme Co. M100 and Beta Co. M200), a notification associated with related shopping missions conducted by other users that also conducted a "television" shopping mission (e.g., related to USB devices, gift cards, etc.), or other notifications that would assist the user with a current or future shopping mission. The second network page 1020 can present the items in various ways (e.g., "customers who search for LED & LED TVs also search for . . . ," "customers who purchase LED & LED TVs also purchase . . . ," or other variants of providing items in a notification, etc.). The user can complete the first shopping mission related to an Acme television and the second network page 1020 can present the next shopping mission, which may be a wall mount for the television, peripheral cables (e.g., High-Definition Multimedia Interface (HDMI), USB, etc.), and the like.

The notification may be provided to the user, merchant, or electronic marketplace. The notification may include various content, including an advertisement, recommendation, item or list of items, reminder of an incomplete shopping mission, or other information associated with the cluster or shopping mission. In some examples, a network page display may be updated to assist the user in their shopping mission. The notification can include a direct message (e.g., text message, SMS message, MMS message, email, etc.), text or images on an updated network page, information provided to the user through a profile associated with the electronic marketplace, etc.

FIG. 11 illustrates an example of a notification described herein, according to at least one example. In illustration 1100, a network page 1110 is shown that provides a notification. The network page 1110 may be provided after a user adds an item to a cart as an "upsell cart page" (e.g., when a user adds an item to an electronic shopping cart associated with the electronic marketplace and the network page 1110 suggest items that cost more, are more popular with other users, or accessories to accompany the item, etc.), when a user purchases an item as a "thank you page," and/or in response to other events or interactions. The notification may include items related to the purchase, their next likely purchase, items featured on a gateway and/or summary of items associated with the user and/or the user's profile, or other information. In some examples, the gateway may be a "welcome" network page that is presented to the user when the user opens a network browser or other application to perform interactions with one or more network pages.

The notification may introduce a user to their next likely shopping mission. For example, the user may be in the middle of a first shopping mission (e.g., at an average depth of a shopping mission, in between starting the shopping mission and purchasing an item in the shopping mission, etc.). Users in the past that conduct the same or similar shopping mission may start a second shopping mission at this point, so the computing device can introduce this second shopping mission to the user (e.g., via the network page, via a direct message, etc.). As an illustration, the user may be searching for a mobile phone and browse through three related mobile phone items. At this point of the shopping mission, other users have customarily started searching for mobile phone accessories, including a mobile phone case or charging device. The computing device can introduce the user to these other shopping missions (e.g., mobile phone accessories, etc.) through one or more notifications, based in part on the state of the user with respect to the identified shopping mission. In another example, when a first shopping mission is determined to complete, the computing device can provide a notification to the user that includes a recommended item from a different cluster or shopping mission.

In some examples, the next likely shopping mission may be identified based in part on a mission graph. A mission graph may identify related shopping missions. For example, a mission graph can help identify similarities between interactions performed by other users, purchased items, shopping missions, item identifiers, and other data, even when the items are not similar. The mission graph may be used to predict a likely next shopping mission of the user or predict a low likelihood or bias toward other shopping missions of the user. A sample illustration may include when users participate in a mobile phone shopping mission and also participate in a mobile phone accessories shopping mission. The mobile phone and mobile phone accessories shopping missions may be related in the mission graph.

The notifications and/or shopping missions may be ranked. For example, a first shopping mission may be ranked higher than a second shopping mission based in part on the history of interactions, interactions of other users associated with the shopping mission, or other information that might cause one shopping mission to correspond with a higher priority than another shopping mission. In some examples, a completed first shopping mission may be more profitable for a first merchant in the electronic marketplace than the profit received from a completed second shopping mission from a second merchant in the electronic marketplace. In another example, the first shopping mission may be ranked higher because the shopping mission is closer to being finished (e.g., based on other users' interactions with the same or similar shopping mission, based on an average number of interactions for the user, etc.).

The ranking may be affected by a decay value. For example, when a reminder (e.g., as content in a notification) is provided to the user for a particular shopping mission that is incomplete, the decay value associated with the shopping mission may be adjusted. To avoid annoying the user, the shopping mission may be ranked lower than other incomplete shopping missions. In some examples, the shopping mission associated with the notification may correspond with a higher decay value than other shopping missions, so that the ranking of the shopping mission is lower based in part on the decay value.

The notification may update a profile associated with the user. For example, the profile may identify the state of the user with respect to the shopping mission (e.g., early in the shopping mission, low depth value, likelihood of purchase=50%, etc.). In some examples, the profile may be used in part to determine which advertisements are presented to the user through the electronic marketplace (e.g., discounts on popular items from the shopping mission, similar items or accessories to accompany the soon-to-be-purchased item from the shopping mission, updating a "Users Who Bought Also Bought This Item" notification on a network page, etc.).

The notification may include information to update a network page, item attributes, or other information in the data store. For example, one or more items may be similar when the items are associated with a cluster (e.g., based on grouping, classification hierarchy, identified similarities between nodes or categories, etc.). However, other users' interactions may identify those items as not similar (e.g., based on purchase or cross-shopping interactions, etc.). The similarities between the items may be disassociated or removed, so that the items may no longer be identified as similar and/or associated with the same cluster or shopping mission. As a sample illustration, a cluster may include "gloves" but other users' interactions separate "work gloves" from "winter gloves" (e.g., users do not look at items associated with "work gloves" when they ultimately purchase an item from the "winter gloves" cluster). The cluster information may be updated to create two separate clusters for "work gloves" and "winter gloves," since the items are not normally related for users' shopping missions.

FIG. 12 illustrates an example of a notification described herein, according to at least one example. In illustration 1200, a network page 1210 is shown that provides a notification. For example, the notification may include additional information for the user to supplement research (e.g., early in a shopping mission, etc.). The additional information can include a link to a blog, feedback from other users who have purchased an item associated with the shopping mission, providing a buying guide to display other related shopping mission that the user might consider that are associated with at least one of the current shopping missions, information to help familiarize the user with a category or associated items, etc.

As illustrated, the notification may include a buying guide. The buying guide may be provided to the user when the shopping mission is relatively new (e.g., associated with a low depth). The user may be at a point of their research when additional information about the shopping mission may be helpful in determining the appropriate item to purchase. The computing device (not shown) may identify the shopping mission for the user as associated with a relatively low depth and provide a buying guide to the user based in part on the depth.

In some examples, the buying guide may be displayed based in part on one or more metrics. For example, when a category associated with the shopping mission has been associated with high levels of research by users before purchase, the buying guide may be provided to the user when the user is associated with that high-research shopping mission. In another example, the buying guide may be provided when the value of the item is above a threshold (e.g., the cost of purchasing the item is at least $100 or $1,000, etc.).

Illustrative methods and systems for associating one or more interactions with a cluster of interactions or a shopping mission are described above. Some or all of these systems and methods may, but need not, be implemented at least partially by architectures such as those shown at least in FIGS. 1-12 above.

Figure 13:
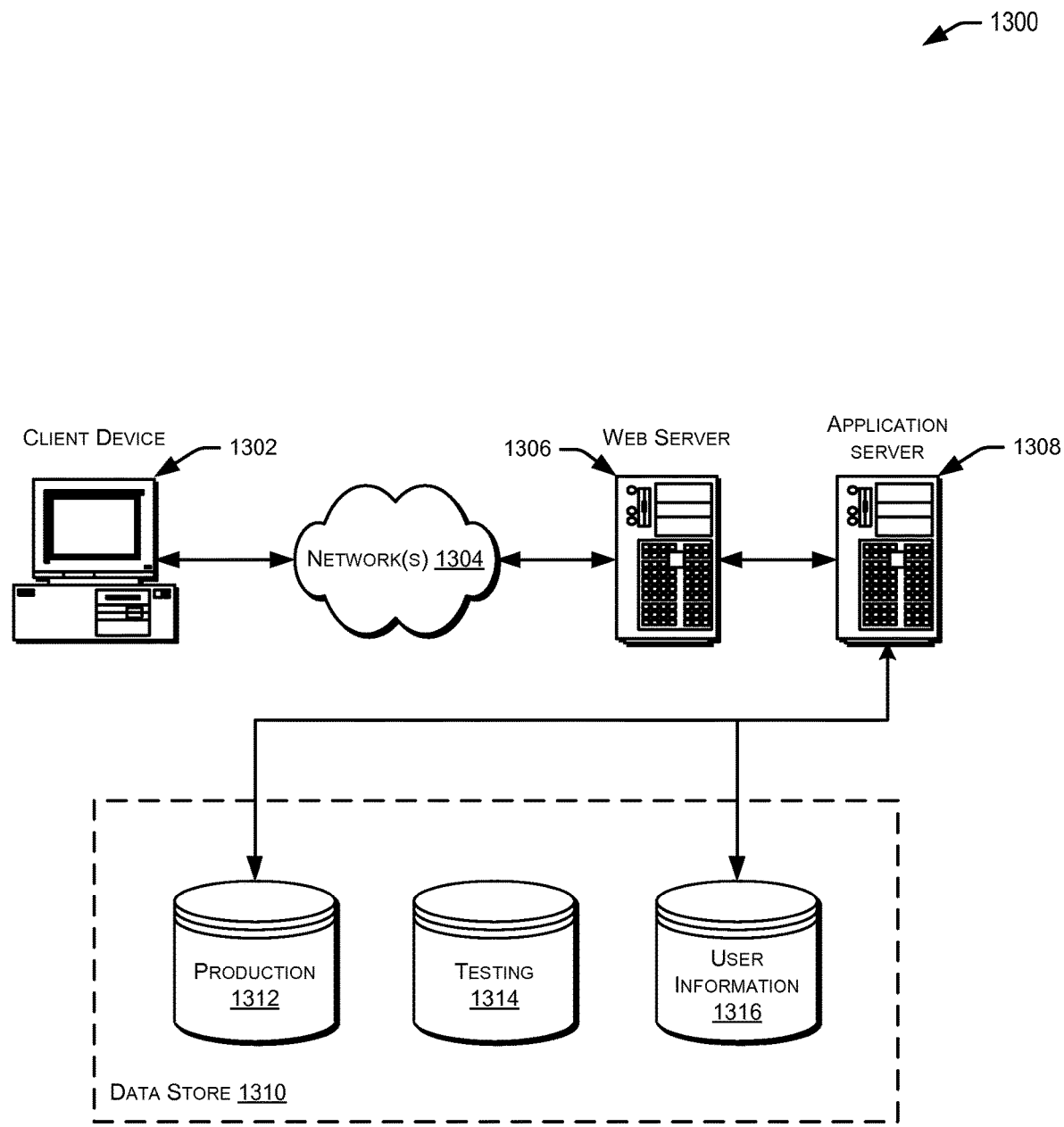
FIG. 13 illustrates an environment in which various embodiments of associating one or more interactions with a cluster of interactions or a shopping mission can be implemented, according to at least one example.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl®, Python® or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing device comprising:
   a memory configured to store computer-executable instructions; and
   a processor in communication with the memory configured to execute the computer-executable instructions to at least:
      receive a history of network page interactions associated with a user and one or more network pages, the history of network page interactions identifying respective times of interactions between the user and the one or more network pages, the history of network page interactions persisting after the user closes a browser application at a user device;
      initiate a clustering process to identify a cluster that includes one or more events from the history of network page interactions, the clustering process starting with a first event from the history of network page interactions, the first event corresponding to a first respective time and a category;
      identify a second event from the history of network page interactions that corresponds to a second respective time that is different from the first respective time;
      associate the second event with the cluster based in part on the second event corresponding to the category;
      analyze the first event and the second event to identify a shopping mission associated with the cluster; and
      determine content to provide to the user based at least in part on a state of the user with respect to the identified shopping mission.

2. The computing device of claim 1, wherein the processor is further configured to execute the computer-executable instructions to at least:
   determine that the identified shopping mission is complete using a probabilistic model.

3. The computing device of claim 2, wherein the probabilistic model determines a probability of whether the shopping mission is ongoing based in part on data identified in a profile of the user.

4. The computing device of claim 1, wherein the processor is further configured to execute the computer-executable instructions to at least:
   identify a trigger to initiate the clustering process, wherein the trigger is received based in part on an interaction between the user and the one or more network pages.

5. The computing device of claim 1, wherein the processor is further configured to execute the computer-executable instructions to at least:
   implement an audit of existing clusters during the clustering process; and
   combine at least two existing clusters using fuzzy clustering when the at least two existing clusters are similar.

6. The computing device of claim 1, wherein the processor is further configured to execute the computer-executable instructions to at least:
   rank the identified shopping mission against other shopping missions; and
   provide a notification for an item associated with the ranked shopping mission.

7. The computing device of claim 1, wherein the processor is further configured to execute the computer-executable instructions to at least:
adjust search results based in part on the identified shopping mission.

8. The computing device of claim 7, wherein the search results are adjusted to display items associated with the identified shopping mission prior to displaying other items that are not associated with the identified shopping mission.

9. A computer-implemented method, comprising:
receiving a history of network page interactions associated with a user and one or more network pages, the history of network page interactions identifying respective times of interactions between the user and the one or more network pages, the history of network page interactions persisting after the user closes a browser application at a user device;
initiating a clustering process to identify a cluster that includes one or more events from the history of network page interactions, the clustering process starting with a first event from the history of network page interactions, the first event corresponding to a first respective time and a category;
identifying a second event from the history of network page interactions that corresponds to a second respective time that is different from the first respective time;
associating the second event with the cluster based in part on the second event corresponding to the category;
analyzing the first event and the second event to identify a shopping mission associated with the cluster; and
determining content to provide to the user based at least in part on a state of the user with respect to the identified shopping mission.

10. The computer-implemented method of claim 9, further comprising:
determining that the identified shopping mission is complete using a probabilistic model.

11. The computer-implemented method of claim 10, wherein the probabilistic model determines a probability of whether the shopping mission is ongoing based in part on data identified in a profile of the user.

12. The computer-implemented method of claim 9, further comprising:
identifying a trigger to initiate the clustering process, wherein the trigger is received based in part on an interaction between the user and the one or more network pages.

13. The computer-implemented method of claim 9, further comprising:
implementing an audit of existing clusters during the clustering process; and
combining at least two existing clusters using fuzzy clustering when the at least two existing clusters are similar.

14. The computer-implemented method of claim 9, further comprising:
ranking the identified shopping mission against other shopping missions; and
providing a notification for an item associated with the ranked shopping mission.

15. The computer-implemented method of claim 9, further comprising:
adjusting search results based in part on the identified shopping mission.

16. The computer-implemented method of claim 15, wherein the search results are adjusted to display items associated with the identified shopping mission prior to displaying other items that are not associated with the identified shopping mission.

17. One or more non-transitory computer-readable storage media collectively storing computer-executable instructions that, when executed by one or more computer systems, configure the one or more computer systems to collectively perform operations comprising:
receiving a history of network page interactions associated with a user and one or more network pages, the history of network page interactions identifying respective times of interactions between the user and the one or more network pages, the history of network page interactions persisting after the user closes a browser application at a user device;
initiating a clustering process to identify a cluster that includes one or more events from the history of network page interactions, the clustering process starting with a first event from the history of network page interactions, the first event corresponding to a first respective time and a category;
identifying a second event from the history of network page interactions that corresponds to a second respective time that is different from the first respective time;
associating the second event with the cluster based in part on the second event corresponding to the category;
analyzing the first event and the second event to identify a shopping mission associated with the cluster; and
determining content to provide to the user based at least in part on a state of the user with respect to the identified shopping mission.

18. The one or more non-transitory computer-readable storage media of claim 17, wherein the operations further comprise:
determining that the identified shopping mission is complete using a probabilistic model.

19. The one or more non-transitory computer-readable storage media of claim 18, wherein the probabilistic model determines a probability of whether the shopping mission is ongoing based in part on data identified in a profile of the user.

20. The one or more non-transitory computer-readable storage media of claim 17, wherein the operations further comprise:
identifying a trigger to initiate the clustering process, wherein the trigger is received based in part on an interaction between the user and the one or more network pages.

* * * * *